US008992876B2

(12) United States Patent
Mishiro et al.

(10) Patent No.: US 8,992,876 B2
(45) Date of Patent: Mar. 31, 2015

(54) METHOD FOR PRODUCING CARBONACEOUS FILM, METHOD FOR PRODUCING GRAPHITE FILM, ROLL OF POLYMER FILM, AND ROLL OF CARBONACEOUS FILM

(75) Inventors: Makoto Mishiro, Settsu (JP); Yusuke Ohta, Settsu (JP); Takashi Inada, Settsu (JP); Yasushi Nishikawa, Settsu (JP)

(73) Assignee: Kaneka Corporation, Osaka-Shi (JP)

( * ) Notice: Subject to any disclaimer, the term of this patent is extended or adjusted under 35 U.S.C. 154(b) by 0 days.

(21) Appl. No.: 14/008,390

(22) PCT Filed: Mar. 26, 2012

(86) PCT No.: PCT/JP2012/002080
§ 371 (c)(1),
(2), (4) Date: Dec. 6, 2013

(87) PCT Pub. No.: WO2012/132391
PCT Pub. Date: Oct. 4, 2012

(65) Prior Publication Data
US 2014/0112859 A1 Apr. 24, 2014

(30) Foreign Application Priority Data

Mar. 28, 2011 (JP) .................................. 2011-071012
Sep. 12, 2011 (JP) .................................. 2011-198581

(51) Int. Cl.
| C01B 31/02 | (2006.01) |
| C08G 73/10 | (2006.01) |
| C01B 31/04 | (2006.01) |
| B32B 18/00 | (2006.01) |
| C04B 35/52 | (2006.01) |
| C04B 35/524 | (2006.01) |

(52) U.S. Cl.
CPC ................. *C01B 31/02* (2013.01); *C08G 73/10* (2013.01); *C01B 31/04* (2013.01); *B32B 18/00* (2013.01); *C04B 35/522* (2013.01); *C04B 35/524* (2013.01); *C04B 2237/363* (2013.01); *C04B 2237/704* (2013.01); *C04B 2237/84* (2013.01)
USPC ..................................... 423/445 R; 264/29.1

(58) Field of Classification Search
CPC ................................. C01B 31/02; C01B 31/04
USPC ....................................... 423/445 R; 264/29.1
See application file for complete search history.

(56) References Cited

U.S. PATENT DOCUMENTS

| 3,917,884 A * | 11/1975 | Jahn .............................. 427/228 |
| 4,193,252 A * | 3/1980 | Shepherd et al. ................ 57/351 |
| 4,895,420 A * | 1/1990 | Waymouth .................... 385/131 |
| 5,776,385 A * | 7/1998 | Gadkaree et al. ............ 264/29.5 |
| 2011/0169180 A1 | 7/2011 | Inada et al. |
| 2012/0121800 A1 | 5/2012 | Kim et al. |

FOREIGN PATENT DOCUMENTS

| JP | 63-256508 A | 10/1988 |
| WO | WO 2010/029761 A1 | 3/2010 |
| WO | WO 2010/150300 A1 | 12/2010 |
| WO | WO 2011/111380 A1 | 9/2011 |

OTHER PUBLICATIONS

The Office Action (including English Translation), dated Oct. 29, 2013, issued in the corresponding Japanese Patent Application No. 2013-507172.
International Search Report for PCT/JP2012/002080 mailed on Jun. 5, 2012.

* cited by examiner

*Primary Examiner* — Stuart Hendrickson
(74) *Attorney, Agent, or Firm* — Birch, Stewart, Kolasch & Birch, LLP

(57) ABSTRACT

Disclosed herein is a method for producing an elongated (rolled) carbonaceous film by polymer pyrolysis while suppressing the fusion bonding and the rippling of the carbonaceous film. The method for producing a carbonaceous film includes the step of heat-treating a polymer film wound into a roll, wherein the heat treatment is performed after the polymer film is wound into a roll at a temperature lower than a pyrolysis onset temperature of the polymer film so that the roll of polymer film has a center and has a space inside its cross-sectional circle (50% cross-sectional circle) (space within 50% cross-sectional circle) whose center is at the center and whose circumference passes through a point at which a length of the polymer film from an inner end thereof is 50% of a total length of the polymer film and that an area of the space within 50% cross-sectional circle is 25% or more of an area of the 50% cross-sectional circle. Particularly, providing a space between a core and an innermost layer of the roll of polymer film is more effective at solving the above problem.

9 Claims, 9 Drawing Sheets

METHOD FOR PRODUCING CARBONACEOUS FILM, METHOD FOR PRODUCING GRAPHITE FILM, ROLL OF POLYMER FILM, AND ROLL OF CARBONACEOUS FILM

TECHNICAL FIELD

The present invention relates to a method for producing an elongated (rolled) carbonaceous film by polymer pyrolysis. More specifically, the present invention relates to an elongated carbonaceous film production process that is an intermediate stage of graphite film production.

BACKGROUND ART

Graphite film is a material having excellent properties such as high thermal conductivity, and is therefore widely used in electronic parts and the like. Examples of a method for producing a commonly-available high thermal conductive graphite film include an expanding method in which exfoliated graphite is rolled into a sheet and a polymer pyrolysis method.

For example, a graphite film production method has been disclosed, in which a polymer film is wound around a graphitic carbon cylinder, more specifically, a laminate of three sheets of POD film having a width of 180 mm and a thickness of 50 μm is wound around a graphitic carbon cylinder having an outer diameter of 68 mm, an inner diameter of 64 mm, and a length of 200 mm and heated at 1800° C. or higher in an inert gas or in a vacuum to obtain an elongated graphite film. (Patent Document 1)

PRIOR ART DOCUMENTS

Patent Document

Patent Document 1: JP-A-63-256508

DISCLOSURE OF THE INVENTION

Problems to be Solved by the Invention

However, the method disclosed in Patent Document 1 has a problem that, in a carbonization step to obtain a carbonaceous film which is a preliminary step in polymer pyrolysis, rippling occurs at the end(s) of a resulting roll of carbonaceous film. Further, when the number of windings is increased, a produced decomposition gas is less likely to be released from between the layers of the film and is therefore fixed between the layers of the film when cooled and acts like an adhesive so that fusion bonding occurs in a resulting roll of carbonaceous film.

It is therefore an object of the present invention to produce an elongated carbonaceous film while the fusion bonding of the carbonaceous film is suppressed.

The reason why the fusion bonding of a carbonaceous film occurs is that a decomposition gas produced during carbonization/decomposition accumulates between the layers of the film and is then fixed when cooled and acts like an adhesive. The size of a resulting carbonaceous film is about 80% of that of a polymer film as a raw material due to shrinkage during carbonization/decomposition. When a polymer film is wound into a roll, the layers of the film press against one another due to the shrinkage during carbonization/decomposition, and therefore a decomposition gas produced during carbonization/decomposition cannot be released from between the layers of the film so that fusion bonding occurs.

Means for Solving the Problems

The present invention provides a method for producing a carbonaceous film, including the step of heat-treating a polymer film wound into a roll, wherein the heat treatment is performed after the polymer film is wound into a roll at a temperature lower than a pyrolysis onset temperature of the polymer film so that the roll of polymer film has a center and has a space inside its cross-sectional circle (50% cross-sectional circle) (space within 50% cross-sectional circle) whose center is at the center and whose circumference passes through a point at which a length of the polymer film from an inner end thereof is 50% of a total length of the polymer film and that an area of the space within 50% cross-sectional circle is 25% or more of an area of the 50% cross-sectional circle (Claim 1), the carbonaceous film production method according to claim 1, wherein the roll of polymer film has a core (Claim 2), the carbonaceous film production method according to claim 2, wherein there is a space between the core and an innermost layer of the roll of polymer film (Claim 3), the carbonaceous film production method according to claim 2 or 3, wherein a value obtained by dividing a diameter of the core (Rs) by an inner diameter of the roll of polymer film (Rf) (Rs/Rf) is 0.90 or lower (Claim 4), the carbonaceous film production method according to any one of claims 1 to 4, wherein in the roll of polymer film, a gap is provided between adjacent layers of the polymer film (Claim 5), the carbonaceous film production method according to claim 5, wherein the gap between adjacent layers of the polymer film is formed by winding the polymer film into a roll together with a slip sheet and then removing the slip sheet (Claim 6), and the carbonaceous film production method according to claim 5, wherein the gap between adjacent layers of the polymer film is formed by rewinding the polymer film wound around a core in a direction opposite to a winding direction of the polymer film (Claim 7)

The present invention also provides a method for producing a graphite film, including heat-treating a carbonaceous film produced by the carbonaceous film production method according to any one of claims 1 to 7 to a temperature of 2400° C. or higher (Claim 8).

The present invention also provides a roll of polymer film to be used in the carbonaceous film production method according to any one of claims 1 to 7, which has a center and has a space inside its cross-sectional circle (50% cross-sectional circle) (space within 50% cross-sectional circle) whose center is at the center and whose circumference passes through a point at which a length of the polymer film from an inner end thereof is 50% of a total length of the polymer film, wherein an area of the space within 50% cross-sectional circle is 25% or more of an area of the 50% cross-sectional circle (Claim 9).

The present invention also provides a roll of polymer film to be used in the graphite film production method according to claim 8, which has a center and has a space inside its cross-sectional circle (50% cross-sectional circle) (space within 50% cross-sectional circle) whose center is at the center and whose circumference passes through a point at which a length of the polymer film from an inner end thereof is 50% of a total length of the polymer film, wherein an area of the space within 50% cross-sectional circle is 25% or more of an area of the 50% cross-sectional circle (Claim 10).

The present invention also provides a roll of carbonaceous film to be used in the graphite film production method according to claim 8, which has a center and has a space inside its cross-sectional circle (50% cross-sectional circle) (space within 50% cross-sectional circle) whose center is at the center and whose circumference passes through a point at which a length of the carbonaceous film from an inner end thereof is 50% of a total length of the carbonaceous film, wherein an area of the space within 50% cross-sectional circle is 25% or more of an area of the 50% cross-sectional circle (Claim 11).

Effects of the Invention

According to the production method of the present invention, it is possible to prevent adhesion between the layers of the polymer film due to shrinkage during carbonization/decomposition and easily release a gas produced by carbonization/decomposition from between the layers of the film in a carbonization step and therefore to suppress the occurrence of fusion bonding in a resulting roll of carbonaceous film or of graphite film.

PREFERRED MODE FOR CARRYING OUT THE INVENTION

The present invention provides a method for producing a carbonaceous film, including the step of heat-treating a polymer film wound into a roll, wherein the heat treatment is performed after the polymer film is wound into a roll at a temperature lower than a pyrolysis onset temperature of the polymer film so that the roll of polymer film has a center and has a space inside its cross-sectional circle (hereinafter, the cross-sectional circle is referred to as "50% cross-sectional circle") (hereinafter, the space is referred to as "space within 50% cross-sectional circle") whose center is at the center and whose circumference passes through a point at which a length of the polymer film from an inner end thereof is 50% of a total length of the polymer film and that an area of the space within 50% cross-sectional circle is 25% or more of an area of the 50% cross-sectional circle.

The reason why the fusion bonding of a carbonaceous film occurs is that, when a polymer film is wound into a roll, a decomposition gas produced during carbonization/decomposition cannot be released from between the layers of the film because the layers of the film press against one another due to shrinkage during the carbonization/decomposition. The polymer film tends to shrink toward the inside of the roll of polymer film during carbonization/decomposition, and therefore pressing of the layers of the polymer film against one another notably occurs particularly on the inner peripheral side of the roll of polymer film. Therefore, fusion bonding is more likely to occur on the inner peripheral side of a roll of carbonaceous film.

The term "roll" as used in the present invention represents the state of the wound polymer film, and the cross-sectional shape of the roll is not limited and may be, for example, a true circle, an ellipse, or a rectangle.

In the present invention, the polymer film is wound into a roll at a temperature lower than the pyrolysis onset temperature of the polymer film so that the area of the space within 50% cross-sectional circle is 25% or more of the area of the 50% cross-sectional circle before heat treatment, which makes it possible to suppress the fusion bonding of a carbonaceous film.

The term "point at which a length of the polymer film from an inner end thereof is 50% of a total length of the polymer film" refers to, when, for example, the polymer film having a length of 100 m is wound into a roll, a point 50 m away from the end of the innermost layer (innermost end) toward the outer periphery of the roll of polymer film.

Figure 1:
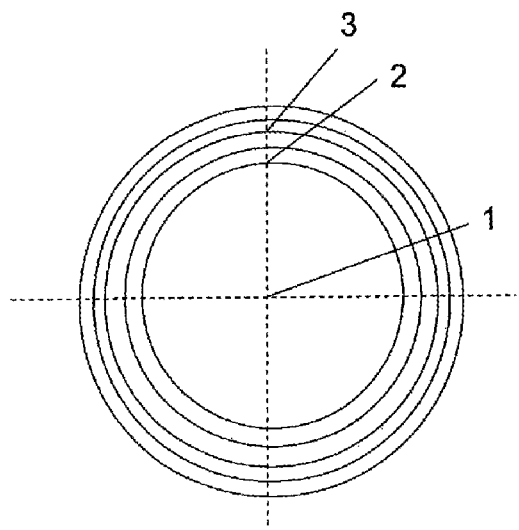
FIG. 1 is a drawing showing an end of a roll of polymer film according to the present invention.

When the roll of polymer film does not have a core, referring to FIG. 1, the term "space within 50% cross-sectional circle" refers to a space present between a point 3 (i.e., a point 50% of the total film length away from the innermost end of an innermost layer 2 toward the outer periphery of the roll of polymer film) and a central point 1 of the roll of polymer film. When the roll of polymer film has a core, the term "space within 50% cross-sectional circle" refers to a space present between the outer periphery of the core and the point 3 which is 50% of the total film length away from the end of the innermost layer (innermost end) toward the outer periphery of the roll of polymer film.

The term "roll" as used herein represents the state of the wound polymer film, and the cross-sectional shape of the roll is not limited and may be, for example, a true circle, an ellipse, or a rectangle.

(Ratio of Space within 50% Cross-Sectional Circle of Roll of Polymer Film)

The ratio of the space within 50% cross-sectional circle of the roll of polymer film is preferably 25% or higher, more preferably 35% or higher, even more preferably 50% or higher.

In a carbonization step, there is a case where the rippling of a carbonaceous film occurs due to deformation caused by shrinkage during carbonization/decomposition. In order to improve both the fusion bonding and the rippling of a carbonaceous film, the ratio is preferably 25% or higher but 80% or lower, more preferably 35% or higher but 70% or lower, even more preferably 50% or higher but 60% or lower.

(Location where Space within 50% Cross-Sectional Circle of Roll of Polymer Film is Formed)

Fusion bonding is likely to occur particularly on the inner peripheral side of a roll of carbonaceous film, and therefore when spaces having the same cross-sectional area are formed, one formed nearer the innermost layer of the roll of polymer film can have a higher fusion bonding-suppressing effect.

It is to be noted that a space may or may not be formed outside the 50% cross-sectional circle. However, a space is preferably formed also outside the 50% cross-sectional circle because fusion bonding is more likely to be relieved.

(Timing to Form Space within 50% Cross-Sectional Circle of Roll of Polymer Film)

The space within 50% cross-sectional circle of the roll of polymer film is preferably formed at a temperature lower than the pyrolysis onset temperature of the polymer film. By forming the space before the start of pyrolysis, shrinkage during carbonization/decomposition can be relieved, and therefore fusion bonding can be suppressed. The space may be formed before the polymer film is set in a furnace or may be formed in the process of heat treatment.

The term "pyrolysis onset temperature of the polymer film" as used herein is defined as a temperature at which, when the polymer film is heat-treated, a weight reduction of 1.0% of the initial weight of the polymer is achieved. More specifically, the pyrolysis onset temperature of the polymer film is defined as a temperature at which a 1.0% weight reduction is achieved when 10 mg of a sample is heat-treated using a thermal analysis system EXSTAR6000 and a thermogravimetric measurement device TG/DTA 220U manufactured by SII Nano Technology Inc. under a flowing nitrogen atmosphere (200 mL/min) from room temperature (23° C.) to 1000° C. at a temperature rise rate of 10° C./min.

In the case of polyimide films (APICAL AH manufactured by Kaneka Corporation, 75 µm, APICAL AV manufactured by Kaneka Corporation, thickness: 50 µm) used in Examples of the present invention, their pyrolysis onset temperature is 500° C. The measurement of the pyrolysis onset temperature was made according to the above definition.

(Method for Forming Space)

Examples of a method for forming a space include: (1) a method in which a gap is formed between adjacent layers of the polymer film; and (2) a method in which a core having an outer diameter smaller than the inner diameter of the roll of polymer film is provided.

(1) Method in which Gap is Formed Between Adjacent Layers of Polymer Film

Figure 2:
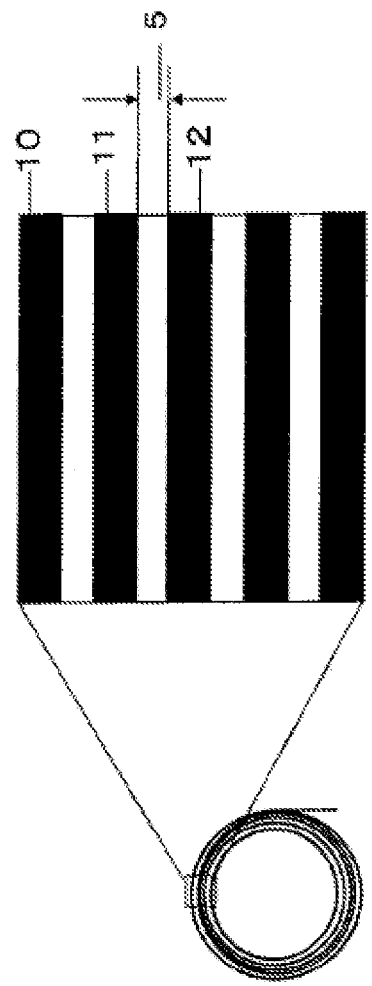
FIG. 2 is a drawing showing adjacent layers of the polymer film according to the present invention.

The term "adjacent layers of the polymer film" as used herein refers to the layers of the polymer film present adjacent to each other in the roll of polymer film. Referring to FIG. 2, the adjacent layers of the polymer film correspond to a polymer film 10 and a polymer film 11 or the polymer film 11 and a polymer film 12.

By forming a gap between adjacent layers of the polymer film, it is possible to provide a space and therefore to suppress fusion bonding. Two or more gaps may be formed between the layers of the polymer film or only one gap may be formed between specific two layers of the polymer film.

(2) Method in which Core Having Outer Diameter Smaller than Inner Diameter of Roll of Polymer Film is Provided Fusion bonding is likely to occur particularly on the inner peripheral side of a roll of carbonaceous film, and therefore a space formed nearer the innermost layer of the roll of polymer film can have a higher fusion bonding-suppressing effect. Therefore, providing a core having an outer diameter smaller than the inner diameter of the roll of polymer film makes it possible to effectively suppress shrinkage during carbonization and therefore to suppress fusion bonding. Further, the use of such a core can support the polymer film shrinking toward the inside of the roll of polymer film, which makes it possible to suppress deformation during shrinkage and therefore to suppress the rippling of a carbonaceous film.

<Diameter of Core>

The diameter of the core is not particularly limited, but a value obtained by dividing the diameter of the core (Rs) by the inner diameter of the roll of polymer film (Rf) (Rs/Rf) is preferably in a specific range. More specifically, the value is preferably 0.90 or lower, more preferably 0.88 or lower, even more preferably 0.85 or lower, and the lower limit of the value is not particularly limited. When the value of Rs/Rf is 0.90 or lower, shrinkage during carbonization can be relieved, and therefore fusion bonding can be effectively suppressed.

Further, according to the production method of the present invention, the size of a space can be controlled, which makes it possible to suppress deformation caused by shrinkage during carbonization/decomposition and therefore to suppress the rippling of a carbonaceous film.

In order to suppress not only the fusion bonding but also the rippling of a carbonaceous film, the value of Rs/Rf is preferably 0.70 or higher but 0.90 or lower. The lower limit value of Rs/Rf is more preferably 0.80 or higher, even more preferably 0.83 or higher.

When the value of Rs/Rf is 0.70 or higher, deformation during carbonization shrinkage can be suppressed, and therefore rippling can be suppressed.

<Material of Core>

A material of the core is first required to withstand continuous use at 500° C. or higher. Examples of a material of the container that satisfies such a requirement include ceramics such as alumina (Al2O3), zirconia (ZrO2), quartz (SiO2), silicon carbide (SiC), titania (TiO2), magnesia (MgO), silicon nitride (Si3N4), aluminum nitride (AlN), yttria (Y2O3), mullite (3Al2O3.2SiO2), cordierite (2MgO.2Al2O3.5SiO2), steatite (MgO.SiO2), and forsterite (2MgO.SiO2). When a carbonization step and a graphitization step are continuously performed, a material that can withstand continuous use at 2000° C. or higher, preferably 2800° C. or higher is preferably used. Examples of such a material include a woven-fabric or felt of carbon fibers, a C/C composite material obtained by reinforcing graphite with carbon fibers, and an isotropic graphite material such as an extrusion-molded article, a die-molded article, or a cold isostatically pressed article.

Further, the core material preferably has a tensile elastic modulus of 30 GPa or higher. When the core material has a tensile elastic modulus of 30 GPa or higher, deformation of the polymer film during carbonization shrinkage can be suppressed, and therefore rippling can be suppressed.

The inner surface of the core preferably has less surface irregularities, and the cross-sectional shape of the core is preferably close to a circle and is particularly preferably a true circle.

(Formation of Gap Between Adjacent Layers of Polymer Film)

When the roll of polymer film has a space provided inside a point 50% of the total film length away from the end of the innermost layer of the roll of polymer film, fusion bonding can be more effectively suppressed by further providing a gap between adjacent layers of the polymer film. Particularly, when a core having an outer diameter smaller than the inner diameter of the roll of polymer film is provided, fusion bonding can be effectively suppressed by further forming a gap between adjacent layers of the polymer film.

<Ratio of Layers of Polymer Film Between which Gap is Formed>

The ratio of layers of the polymer film between which a gap is provided to the total layers of the polymer film of the roll of polymer film is preferably 50% or higher, more preferably 75% or higher. By setting the ratio of layers of the polymer film between which a gap is provided to the total layers of the polymer film of the roll of polymer film to 50% or higher, pressing of the layers of the polymer film against one another during carbonization/decomposition can be relieved.

<Location where Gap Between Adjacent Layers of Polymer Film Is Formed>

The gap is particularly preferably formed on the inner peripheral side of the roll of polymer film. The polymer film tends to shrink toward the inside of the roll of polymer film during carbonization/decomposition, and therefore pressing of the layers of the polymer film against one another notably occurs particularly on the inner peripheral side of the roll of polymer film. Therefore, fusion bonding is also likely to occur on the inner peripheral side of a roll of carbonaceous film. For this reason, the gap formed on the inner peripheral side of the roll of polymer film has a high fusion bonding-relieving effect.

<Value Obtained by Dividing Thickness of Gap Between Adjacent Layers of Polymer Film (Ts) by Thickness of Polymer Film (Tf) (Ts/Tf)>

As for a value obtained by dividing the thickness of a gap between adjacent layers of the polymer film (Ts) by the thickness of the polymer film (Tf) (Ts/Tf), the value of Ts/Tf inside the 50% cross-sectional circle of the roll of polymer film is preferably 0.6 or higher, more preferably 1.0 or higher. By setting the value of Ts/Tf inside the 50% cross-sectional circle of the roll of polymer film to 0.6 or higher, a higher fusion bonding-improving effect can be obtained.

When the diameter of the core is made smaller than the inner diameter of the roll of polymer film, the value of Ts/Tf inside the 50% cross-sectional circle of the roll of polymer film is preferably 0.4 or higher, more preferably 0.5 or higher, even more preferably 0.6 or higher, and is preferably 1.5 or lower, more preferably 1.0 or lower, even more preferably 0.9 or lower. By setting the value of Ts/Tf inside the 50% cross-sectional circle of the roll of polymer film to 0.4 or higher, a higher fusion bonding-improving effect can be obtained, and by setting the value of Ts/Tf inside the 50% cross-sectional circle of the roll of polymer film to 1.5 or lower, the rippling of a carbonaceous film can be suppressed.

The value of Ts/Tf outside the 50% cross-sectional circle of the roll of polymer film is, from the viewpoint of enhancing a fusion bonding-improving effect and suppressing the rippling of a carbonaceous film, preferably 0.25 or higher, more preferably 0.33 or higher, even more preferably 0.5 or higher, and is preferably 1.50 or lower, more preferably 1.0 or lower, even more preferably 0.9 or lower.

<Method for Measuring Ts/Tf>

<1> When a winding core is present, the outer diameter (Rs) of the winding core is measured (hereinafter, the winding core is also referred to as "core").

Figure 8:
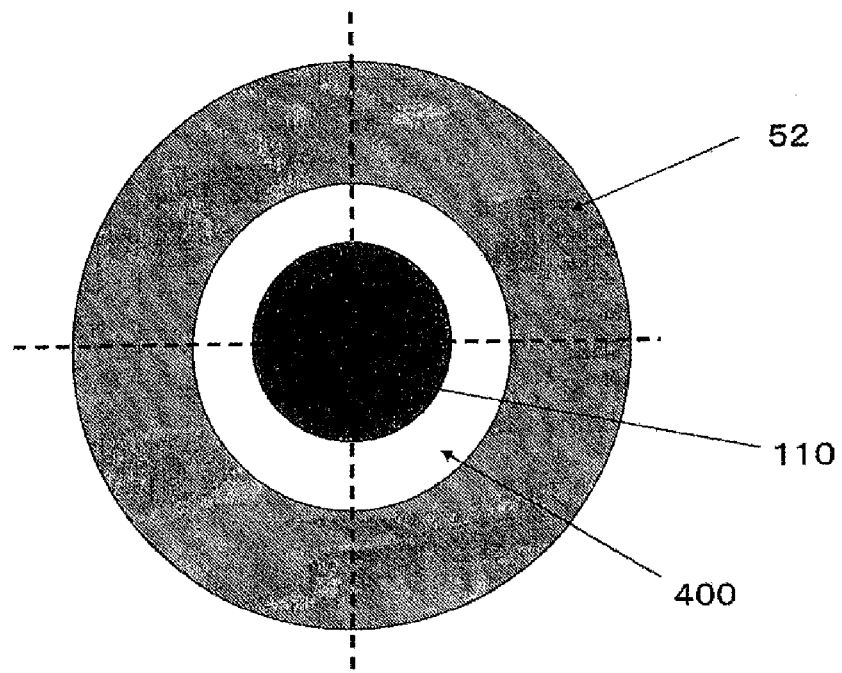
FIG. 8 is a drawing showing an end of the roll of polymer film according to the present invention.

<2> The end of outermost layer of a roll of polymer film 52 is fixed so as not to move, and then the inner diameter (Ra) and the outer diameter (Rb) of the roll of polymer film are measured. In the measurement of Ra and Rb, as shown in FIG. 8, an average of the length of a line segment on a straight line passing through the center of the roll of polymer film 52 and the outermost end of the roll of polymer film 52 and the length of a line segment on a straight line orthogonal to the above straight line is used. The term "outermost end" as used herein refers to the end of outermost layer of the roll of polymer film farthest from the center of the roll of polymer film. It is to be noted that in FIG. 8, the end face (side face) of the roll of polymer film is shown as a true circle, but is not limited thereto.

It is to be noted that when a diameter or a thickness related to the roll of polymer film is measured in the present invention, as described above, an average of the length of a line segment on a straight line passing through the center of the roll of polymer film 52 and the outermost end of the roll of polymer film 52 and the length of a line segment on a straight line orthogonal to the above straight line is always used.

Figure 9:
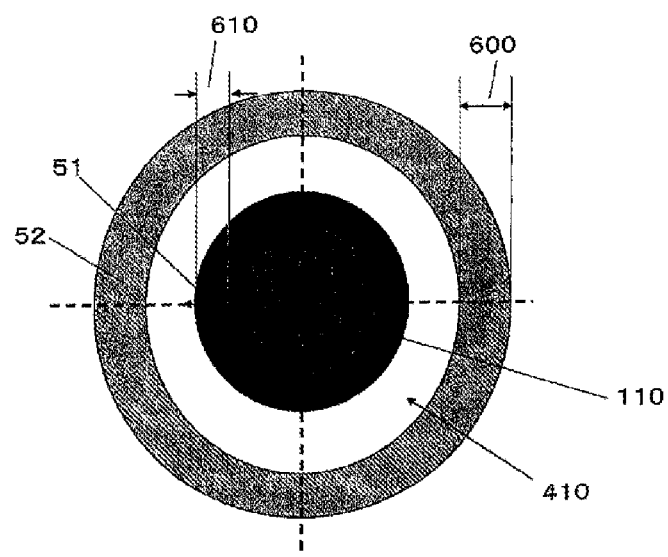
FIG. 9 is a drawing showing an end of the roll of polymer film according to the present invention during measurement of a space.

<3> When a gap(s) is(are) present inside the roll of polymer film 52, the value of Ts/Tf is determined in the following manner. The polymer film is wound around a core 110, provided inside the innermost layer of the roll of polymer film 52, from the inner end thereof while a tension of 10 N/m or more is applied thereto so that no gap is formed between the layers of the polymer film (FIG. 9). While the polymer film is wound around the core in such a way, a thickness 610(A) of layers of a polymer film 51 wound around the core and a thickness 600(B) of the roll of polymer film 52, located outside the polymer film 51 wound around the core, after winding the polymer film around the core are measured every time the number of layers of the polymer film rewound from the roll of polymer film 52 reaches 10 after the roll of polymer film 52 is started to be rewound from the inner side thereof.

Here, when the thickness of layers of the polymer film 51 wound around the core at the time when the first 10 layers of the roll of polymer film 52 are rewound is defined as $A_1$, the thickness of layers of the polymer film 51 at the time when 10 n layers of the roll, of polymer film 52 are rewound is represented as $A_n$. Similarly, the thickness of the roll of polymer film 52 after winding the polymer film around the core at the time when 10 n layers are rewound is represented as $B_n$.

The measurement of thickness is made using a calibrated vernier caliper by bringing the vernier caliper into contact with the polymer film without applying pressure on the polymer film. The thickness of the roll of polymer film 52 is measured at four points at which mutually-orthogonal straight lines passing through the center of the roll of polymer film 52 intersect with the roll of polymer film 52, and an average of the measurements is used as the thickness of the roll of polymer film 52.

<4> The polymer film 51 wound around the core has the same cross-sectional area as the polymer film rewound from the roll of polymer film 52, and therefore the cross-sectional area of the gap(s) (space) formed between the layers of the polymer film is determined by calculating a difference between the cross-sectional area of a portion where the polymer film is rewound from the roll of polymer film 52 and the cross-sectional area of a portion where the polymer film is wound around the core. Further, the cross-sectional area of the gap(s) formed between the layers of the polymer film is divided by the cross-sectional area of the polymer film as the formula below to determine the ratio of the gap(s) formed per length of 10 layers of the polymer film (i.e., Ts/Tf). It is to be noted that the values of the ratio may be graphed to determine the ratio of the gap(s) present between the inner end and the specific point (e.g., between the inner end and the 50% film length point) of the entire polymer film.

$$T_s/T_f = ((Ra/2+B_n)^2\pi - (Ra/2+B_{n-1})^2\pi - ((Rs/2+A_n)^2\pi - (Rs/2+A_{n-1})^2\pi))/((Rs/2+A_n)^2\pi - (Rs/2+A_{n-1})^2\pi)$$ [Formula 1]

<5> Finally, the thickness of layers of the polymer film wound around the core is measured after the entire polymer film is wound around the core without forming any gap to determine the cross-sectional area of the entire roll of polymer film having no gap.

By determining the cross-sectional area of the entire roll of polymer film, it is also possible to determine a point 50% of the total film length away from the end of the innermost layer of the roll of polymer film and therefore to determine the ratio of the gap(s) formed between the end of the innermost layer and the 50% film length point of the roll of polymer film.

It is to be noted that when the roll of polymer film has an elliptical or non-circular cross-sectional shape, the cross-sectional shape of the roll of polymer film is brought close to a circle so that the length of a line segment on a straight line passing through the center of the roll of polymer film and the outermost end of the roll of polymer film and the length of a line segment on a straight line orthogonal to the above straight line are approximately the same to perform measurements according to <1> to <5>.

<Method for Forming Gaps Between Adjacent Layers of Polymer Film>

Examples of a method for forming gaps between the layers of the polymer film include: (1) a method in which the roll of polymer film is loosened by reducing the pressure in the process of heat treatment; (2) a method in which the polymer film is wound into a roll together with a slip sheet and then the slip sheet is removed; and (3) a method in which the polymer film wound around a core is rewound in a direction opposite to the winding direction of the polymer film.

(1) Method in which Gaps are Formed by Heating Under Reduced Pressure

In the case of a method in which heat treatment is performed under a reduced pressure, air trapped between the layers of the polymer film during winding the polymer film or moisture absorbed by the polymer film is expanded so that the roll of polymer film is loosened and therefore gaps are formed.

The temperature zone at which a reduced pressure is performed is preferably a temperature, zone before which carbonization/decomposition of the polymer film starts. More specifically, the temperature zone at which a reduced pressure is performed is preferably in the range of room temperature to 500° C., more preferably in the range of 100 to 450° C., even more preferably in the range of 300 to 450° C. In the zone at or above which carbonization/decomposition of the polymer film starts, fusion bonding can be further improved by configuring a furnace so that a gas in the furnace can be discharged while an inert gas such as nitrogen or argon is introduced into the furnace.

Examples of a method for controlling the size of gaps include: a method in which the amount of air to be trapped or the amount of moisture to be absorbed is controlled; and a method in which an external tube or the like is provided outside the roll of polymer film so that the loosening of the roll of polymer film can be regulated.

(2) Method in which Polymer Film is Wound into Roll Together with Slip Sheet and then Slip Sheet is Removed In the case of a method in which the polymer film is wound into a roll together with a slip sheet and then the slip sheet is removed, the size of resulting gaps corresponds to the thickness of the slip sheet and therefore can be easily controlled to any value. Therefore, for example, gaps on the inner peripheral side of the roll of polymer film where fusion bonding is more likely to occur can be made larger than those on the outer peripheral side of the roll of polymer film, which makes it possible to more effectively suppress fusion bonding. Further, gaps can be stably formed, and therefore variations in the occurrence of fusion bonding can also be suppressed. The gaps formed between the layers of the polymer film are uniform in size, and therefore a shrinkage force during carbonization/decomposition is evenly distributed over the entire polymer film, which is highly effective at suppressing rippling. It is to be noted that the slip sheet may be continuous or discontinuous. For example, the slip sheet may be partially inserted to arbitrarily form a gap(s).

<Timing to Remove Slip Sheet>

The timing to remove the slip sheet is not particularly limited as long as the slip sheet is removed at a temperature lower than the pyrolysis onset temperature of the polymer film. The slip sheet may be removed just after the polymer film is wound into a roll together with the slip sheet or may be removed in the process of heat treatment. However, in view of the ease of removal of the slip sheet or the disposal of the removed slip sheet, the slip sheet is preferably removed before the polymer film is set in a heat treatment furnace.

<Type of Slip Sheet>

The type of slip sheet to be used is not particularly limited, and examples of the slip sheet include polymer films, paper, and graphite films. The slip sheet is preferably such a film that, when removed, the slip sheet does not cause damage to the polymer film or the slip sheet itself does not tear. Further, when the method in which the polymer film is wound into a roll together with a slip sheet and then the slip sheet is removed is used, the slip sheet is preferably easily removed. Therefore, the slip sheet may be made easy to remove by subjecting the surface thereof to release treatment using a silicone- or fluorine-based agent or the like to improve slipping properties. However, when a component contained in the slip sheet is to adhere to the polymer film, a material that does not inhibit carbonization of the polymer film or does not cause fusion boning or rippling is preferably selected.

<Width of Slip Sheet>

The width of the slip sheet is not particularly limited, but is preferably small to make it easy to remove the slip sheet. More specifically, the width of the slip sheet is preferably 50 mm or less, more preferably 30 mm or less, even more preferably 20 mm or less.

<Location where Slip Sheet is Provided>

When the slip sheet has a smaller width than the polymer film, the slip sheet is preferably provided on the end side of the polymer film. By winding the polymer film into a roll together with the slip sheet in such a manner that the slip sheet is located on the end side of the polymer film, the slip sheet can be easily removed. The polymer film may be wound into a roll together with the slip sheet in such a manner that part of the slip sheet is located outside the end of the polymer film to make it easy to remove the slip sheet. The number of locations where the slip sheet is provided may be one or two or more. For example, when the polymer film is wound into a roll together with the slip sheet in such a manner that the slip sheet is located on the end side of the polymer film, the slip sheets may be provided on both end sides of the polymer film or the slip sheet may be provided on only one of the end sides of the polymer film.

<Method for Removing Slip Sheet>

A method for removing the slip sheet is not particularly limited, but the slip sheet can be removed by mechanical drawing or by using, as the slip sheet, a film that evaporates at a temperature lower than the pyrolysis temperature of the polymer film.

<Winding Conditions>

Conditions under which the polymer film is wound into a roll together with the slip sheet are not particularly limited, but are preferably set so that the slip sheet is easily removed. More specifically, a winding tension is preferably 80 N/m or less, more preferably 40 N/m or less, even more preferably 20 N/m or less. Further, the polymer film may be wound into a roll together with the slip sheet while being diselectrified to improve slippage between them, which makes it easy to remove the slip sheet.

(3) Method in which Polymer Film Wound Around Core is Rewound in Direction Opposite to Winding Direction of Polymer Film Gaps can be formed by winding the polymer film around a core under tension and then rewinding the polymer film in a direction opposite to the winding direction of the polymer film. Further, the size of gaps can also be controlled by, for example, providing a tube outside the roll of polymer film because it is possible to inhibit the expansion of the polymer film beyond the interior space of the tube.

Figure 10:
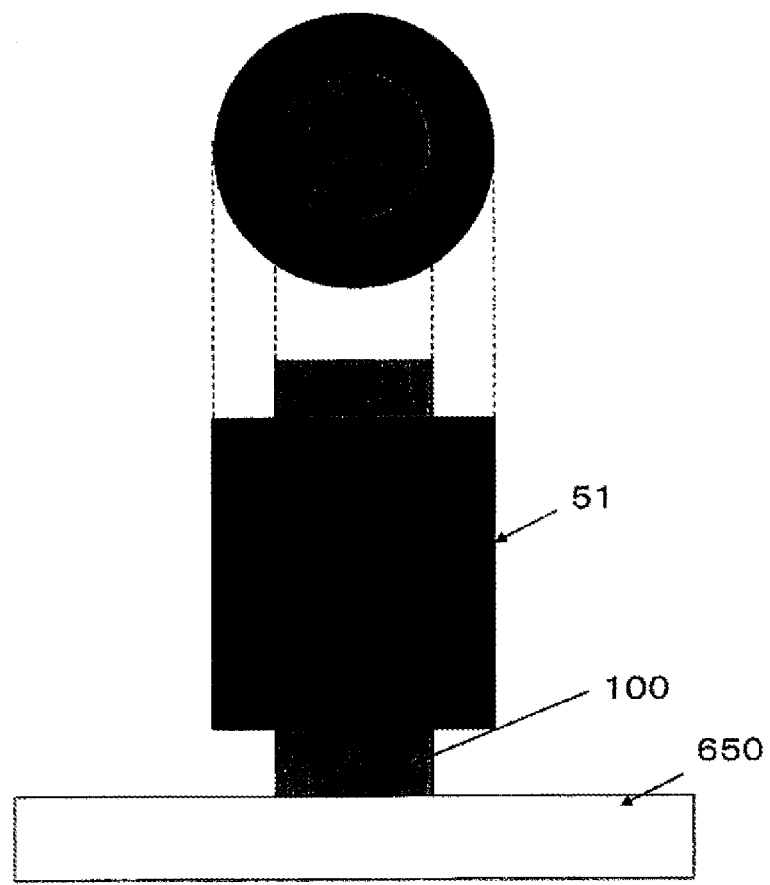
FIG. 10 is a drawing illustrating a method for forming gaps between the layers of a polymer film according to Example 42 of the present invention.

Further, as shown in FIG. 10, when the roll of polymer film wound around a core having a length longer than the width of the roll of polymer film is vertically placed, the polymer film falls down when rewound to loosen the roll of polymer film, which makes it easier to form gaps. This is because a force to expand the polymer film is usually directed outward, but in this case the force can be directed not only outward but also downward.

(Heat Treatment Method)

A carbonaceous film according to the present invention is obtained through a carbonization step. The carbonization step is a step in which the polymer film is pyrolyzed by preliminary heating to about 1000° C. to obtain a carbonaceous film. The resulting carbonaceous film is a glassy film having a weight that is about 60% of the weight of the polymer film.

Further, the resulting carbonaceous film may be graphitized in a graphitization step to obtain a graphite film. The graphitization step is a step in which the carbonized film produced in the carbonization step is heated to 2400° C. or higher to graphitize the carbonized film. The carbonization step and the graphitization step may be continuously performed, or only the graphitization step may be performed separately after the completion of the carbonization step.

The heat treatment in the carbonization step may be performed in an inert gas or in a vacuum. At an ambient temperature equal to or higher than the pyrolysis onset temperature of the polymer film, introduction of an inert gas is particularly effective. Particularly, a furnace is preferably configured so that a gas in the furnace can be discharged to the outside of the furnace while an inert gas is introduced into the furnace. At a temperature equal to or higher than the pyrolysis onset temperature of the polymer film, a decomposition gas that causes fusion bonding is produced. Therefore, at a temperature equal to or higher than the pyrolysis onset temperature of the polymer film, introduction of an inert gas allows a decomposition gas produced during carbonization/decomposition to be pushed out of a system by the inert gas entering gaps between the layers of a film produced by the production method according to the present invention. Further, the decomposition gas pushed out of the system is discharged to the outside of the furnace together with the inert gas, which makes it possible to reduce the risk of newly causing fusion bonding.

The flow rate of the inert gas to be introduced is not particularly limited, but is preferably 1 L/min or higher, more preferably 3 L/min or higher, even more preferably 5 L/min or higher.

Further, the resulting carbonaceous film may be graphitized in a graphitization step to obtain a graphite film. The graphitization step is a step in which the carbonized film produced in the carbonization step is heated to 2400° C. or higher to graphitize the carbonized film. In this step, the carbonized film is graphitized so that a graphite film having high thermal conductivity is obtained. By converting the carbonized film to a graphite film, the graphite film has significantly-improved thermal conductivity and is increased in size by about 10%.

When a graphite film is produced from the polymer film, the carbonization step and the graphitization step may be performed continuously or only the graphitization step may be performed separately after the completion of the carbonization step.

The heat treatment in the graphitization step may be performed in an inert gas or in a vacuum. The orientation of the roll of carbonaceous film is appropriately selected and may be horizontal or vertical. The core may be used also during graphitization after carbonization or may be removed.

The roll of carbonaceous film obtained in the carbonization step may be directly subjected to the graphitization step, or may be cut into sheets of appropriate size and, if necessary, stacked together before subjected to the graphitization step.

The resulting graphite film may be subjected to a pressing step to impart excellent flexibility to it.

(Shape of Roll of Polymer Film)

A roll of polymer film to be used in the present invention preferably has a center and has a space inside its cross-sectional circle (50% cross-sectional circle) (space within 50% cross-sectional circle) whose center is at the center and whose circumference passes through a point at which a length of the polymer film from an inner end thereof is 50% of a total length of the polymer film, wherein an area of the space within 50% cross-sectional circle is 25% or more of an area of the 50% cross-sectional circle. By using, such a roll of polymer film, a carbonaceous film or a graphite film can be obtained while fusion bonding is suppressed.

(Shape of Roll of Carbonaceous Film)

A roll of carbonaceous film to be used in the present invention preferably has a center and has a space inside its cross-sectional circle (50% cross-sectional circle) (space within 50% cross-sectional circle) whose center is at the center and whose circumference passes through a point at which a length of the carbonaceous film from an inner end thereof is 50% of a total length of the carbonaceous film, wherein an area of the space within 50% cross-sectional circle is 25% or more of an area of the 50% cross-sectional circle. By using such a roll of carbonaceous film, a carbonaceous film or a graphite film can be obtained while fusion bonding is suppressed. Further, the area of the space within 50% cross-sectional circle of the roll of carbonaceous film is 25% or more of the area of the 50% cross-sectional circle, which is preferred in that a graphite film can be obtained while the occurrence of flaws or tears is suppressed.

(Container for Accommodating Polymer Film)

A container for accommodating the roll of polymer film having a gap(s) may be optionally provided. When provided, the container is preferably configured so that the roll of polymer film is prevented from excessively expanding or the winding end of the polymer film is prevented from moving. By preventing the roll of polymer film from excessively expanding or by preventing the winding end of the polymer film from moving, it is possible to prevent the rippling of a carbonaceous film. More specifically, for example, a cylindrical tube or the like may be provided outside the polymer film.

When provided outside the polymer film, the container preferably has air permeability, and more preferably has an opening for ventilation in at least part thereof. By allowing the external tube to have air permeability, a produced decomposition gas can be easily discharged, and therefore fusion bonding can be further suppressed. A material of the external tube is required, for example, to withstand continuous use at 500° C. or higher.

Examples of a material of the container that satisfies such a requirement include ceramics such as alumina (Al2O3), zirconia (ZrO2), quartz (SiO2), silicon carbide (SiC), titania (TiO2), magnesia (MgO), silicon nitride (Si3N4), aluminum nitride (AlN), yttria (Y2O3), mullite (3Al2O3.2SiO2), cordierite (2MgO.2Al2O3.5SiO2), steatite (MgO.SiO2), and forsterite (2MgO.SiO2). When a carbonization step and a graphitization step are continuously performed, a material that can withstand continuous use at 2000° C. or higher, preferably 2800° C. or higher is preferably used. Examples of such a material include a C/C composite material obtained by reinforcing graphite with carbon fibers and an isotropic graphite material such as an extrusion-molded article, a die-molded article, or a cold isostatically pressed article. Alternatively, a soft material such as a graphite film or a woven fabric or felt of carbon fibers may be wound into a tube. The shape of the external tube is not particularly limited, but the inner surface of the external tube preferably has less surface irregularities because there is a high possibility that the inner surface of the external tube comes into contact with the polymer film. Further, the external tube preferably has a cross-sectional shape close to a circle. The cross-sectional shape of the inner surface may be a rectangle, and the inner surface does not always need to be continuous. For example, a plurality of rings may surround the outer periphery of the roll of polymer film, or a plurality of rod-shaped members may be arranged.

(Orientation of Polymer Film)

In the present invention, the orientation of the roll of polymer film may be horizontal or vertical. When the orientation of the roll of polymer film is horizontal, the roll of polymer film having a gap(s) hangs down. However, fusion bonding can be improved because the roll of polymer film has a gap(s) previously formed according to the present invention.

(Width of Polymer Film)

The width of the polymer film to be used in the present invention is not particularly limited, but is preferably 150 mm or more, more preferably 250 mm or more, even more preferably 500 mm or more. When the width of the polymer film is 150 mm or more, fusion bonding is likely to occur. However, fusion bonding can be effectively suppressed by using the production method according to the present invention.

EXAMPLES

Evaluations (Fusion Bonding)

Evaluation of the occurrence of fusion bonding was made on a roll of carbonaceous film according to the following criteria: "A" the occurrence of fusion bonding was not observed; "B" the occurrence of fusion bonding was observed in 3 to 5 layers; "C" the occurrence of fusion bonding was observed in 6 to 10 layers; "D" the occurrence of fusion bonding was observed in 11 to 19 layers; and "E" the occurrence of fusion bonding was observed in 20 or more layers.

Similarly, evaluation of the occurrence of fusion bonding was made on a roll of graphite film according to the following criteria: "A" the occurrence of fusion bonding was not observed; "B" the occurrence of fusion bonding was observed in 3 to 5 layers; "C" the occurrence of fusion bonding was observed in 6 to 10 layers; "D" the occurrence of fusion bonding was observed in 11 to 19 layers; and "E" the occurrence of fusion bonding was observed in 20 or more layers.

(Rippling)

Figure 3:
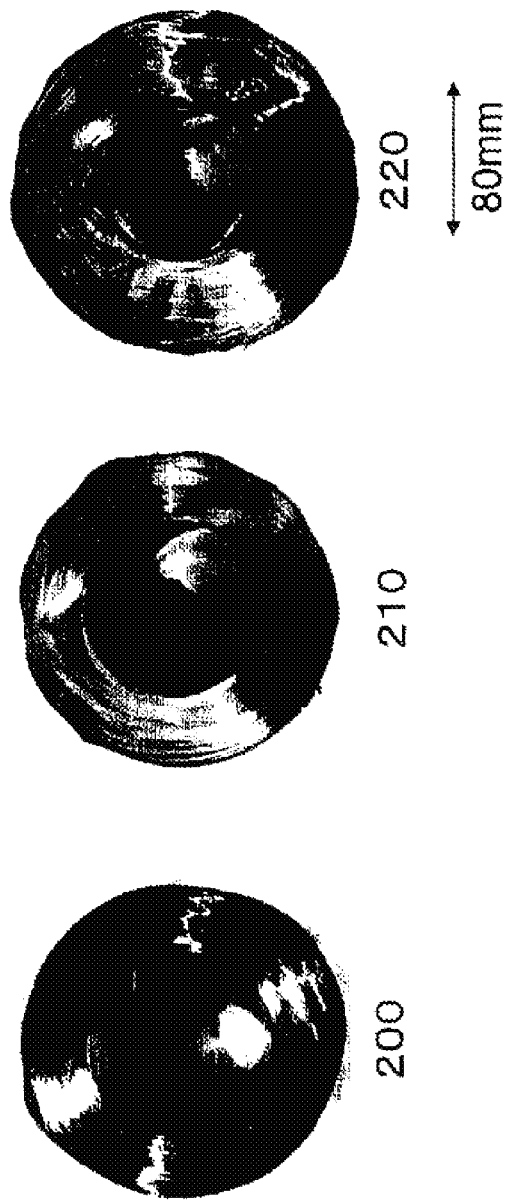
FIG. 3 is a drawing illustrating rippling of a carbonaceous film according to the present invention.

Evaluation of the occurrence of rippling was made on a roll of carbonaceous film according to the following criteria: "A" the degree of rippling at the end of the roll is equal to or less than that at the end of a roll 200 shown in FIG. 3; "B" the degree of rippling at the end of the roll is greater than that at the end of the roll 200 but equal to or less than that at the end of a roll 210 shown in FIG. 3; "C" the degree of rippling at the end of the roll is greater than that at the end of the roll 210 but equal to or less than that at the end of a roll 220 shown in FIG. 3; and "D" the degree of rippling at the end of the roll is greater than that at the end of the roll 220.

Similarly, evaluation of the occurrence of rippling was made on a roll of graphite film according to the following criteria: "A" the degree of rippling at the end of the roll is equal to or less than that at the end of a roll 200 shown in FIG. 3; "B" the degree of rippling at the end of the roll is greater than that at the end of the roll 200 but equal to or less than that at the end of a roll 210 shown in FIG. 3; "C" the degree of rippling at the end of the roll is greater than that at the end of the roll 210 but equal to or less than that at the end of a roll 220 shown in FIG. 3; and "D" the degree of rippling at the end of the roll is greater than that at the end of the roll 220.

<Method for Measuring Cross-Sectional Area of Space within 50% Cross-Sectional Circle>

<1> When a winding core was present, the outer diameter (Rs) of the winding core was measured (hereinafter, the winding core is also referred to as "core").

<2> The end of outermost layer of a roll of polymer film was fixed so as not to move, and then the inner diameter (Ra) and the outer diameter (Rb) of the roll of polymer film were measured. In the measurement of Ra and Rb, as shown in FIG. 8, an average of the length of a line segment on a straight line passing through the center of the roll of polymer film 52 and the outermost end of the roll of polymer film 52 and the length of a line segment on a straight line orthogonal to the above straight line was used.

It is to be noted that when a diameter or a thickness related to the roll of polymer film was measured in the present invention, as described above, an average of the length of a line segment on a straight line passing through the center of the roll of polymer film 52 and the outermost end of the roll of polymer film 52 and the length of a line segment on a straight line orthogonal to the above straight line was always used.

A cross-sectional area 400 of a space between the innermost layer of the roll of polymer film and the core was determined from the inner diameter (Ra) of the roll of polymer film and the outer diameter (Rs) of the core by the following formula.

$$\text{Cross-sectional area of space between innermost layer of roll of polymer film and core} = (Ra/2)^2 \pi - (Rs/2)^2 \pi \qquad \text{[Formula 2]}$$

<3> When a gap(s) was(were) present inside the roll of polymer film 52, the value of Ts/Tf was determined in the following manner. The polymer film was wound around a core 110, provided inside the innermost layer of the roll of polymer film 52, from the inner end thereof while a tension of 10 N/m or more was applied thereto so that no gap was formed between the layers of the polymer film (FIG. 9). While the polymer film was wound around the core in such a way, a thickness 610(A) of layers of a polymer film 51 wound around the core and a thickness 600(B) of the roll of polymer film 52, located outside the polymer film 51 wound around the core, after winding the polymer film around the core were measured every time the number of layers of the polymer film rewound from the roll of polymer film 52 reached 10 after the roll of polymer film 52 was started to be rewound from the inner side thereof.

Here, when the thickness of layers of the polymer film 51 wound around the core at the time when the first 10 layers of the roll of polymer film 52 were rewound is defined as $A_1$, the thickness of layers of the polymer film 51 wound around the core at the time when 10 n layers of the roll of polymer film 52 were rewound is represented as $A_n$. Similarly, the thickness of the roll of polymer film 52 after winding the polymer film around the core at the time when 10 n layers were rewound is represented as $B_n$.

The measurement of thickness was made using a calibrated vernier caliper by bringing the vernier caliper into contact with the polymer film without applying pressure on the polymer film. The thickness of the roll of polymer film 52 was measured at four points at which mutually-orthogonal straight lines passing through the center of the roll of polymer film 52 intersect with the roll of polymer film 52, and an average of the measurements was used as the thickness of the roll of polymer film 52.

At this time, the cross-sectional area of a portion occupied by the polymer film in the roll of polymer film was determined by the following formula.

Cross-sectional area of portion occupied by polymer film in roll of polymer film$=(Rs/2+A_n)^2\pi-(Rs/2)^2\pi$ [Formula 3]

<4> The polymer film 51 wound around the core had the same cross-sectional area as the polymer film rewound from the roll of polymer film 52, and therefore the cross-sectional area of a portion occupied by the gap(s) (space) formed between the layers of the polymer film in the roll of polymer film was determined by calculating a difference between the cross-sectional area of a portion where the polymer film was rewound from the roll of polymer film 52 and the cross-sectional area of a portion where the polymer film was wound around the core.

Cross-sectional area of portion occupied by gap(s) (space) formed between layers of polymer film in roll of polymer film$=((Ra/2+B_n)^2\pi-(Ra/2)^2\pi-((Rs/2+A_n))^2\pi-(Rs/2)^2\pi))$ [Formula 4]

The sum of the cross-sectional area of the space between the innermost layer of the roll of polymer film and the core and the cross-sectional area of the gap(s) (space) formed between the layers of the polymer film in the roll of polymer film was determined as the cross-sectional area of the space in the roll of polymer film. Further, the cross-sectional area of the space in the roll of polymer film was divided by the cross-sectional area of the polymer film to determine the ratio of the space.

<5> Finally, the thickness of layers of the polymer film wound around the core was measured after the entire polymer film was wound around the core without forming any gap to determine the cross-sectional area of the entire roll of polymer film. A point in the roll of polymer film at which the length of the polymer film from the inner end thereof was 50% of the total length of the polymer film was determined from the cross-sectional area of the entire roll of polymer film determined above, and the ratio of the space within 50% cross-sectional circle of the roll of polymer film was determined.

As for the gap(s) between the layers of the polymer film, the ratio of the gap(s) between the layers of the polymer film formed per length of 10 layers of the polymer film (Ts/Tf) was determined by the following formula and graphed to determine how far the gap(s) between the layers of the polymer film was(were) present in the roll of polymer film and the ratio of the gap(s) present in the roll of polymer film (Ts/Tf).

$Ts/Tf=((Ra/2+B_n)^2\pi-(Ra/2+B_{n-1})^2\pi-((Rs/2+A_n)^2\pi-(Rs/2+A_{n-1})^2\pi))/((Rs/2+A_n)^2\pi-(Rs/2+A_{n-1})^2\pi))$ [Formula 5]

It is to be noted that when the roll of polymer film had an elliptical or non-circular cross-sectional shape, the cross-sectional shape of the roll of polymer film was brought close to a circle so that the length of a line segment on a straight line passing through the center of the roll of polymer film and the outermost end of the roll of polymer film and the length of a line segment on a straight line orthogonal to the above straight line were approximately the same to perform measurements according to <1> to <5>.

When the innermost layer of the roll of polymer film was in close contact with the core and the number of turns of the roll of polymer film was not increased by ½ turn or more even by rewinding the polymer film with a tension of 10 N/m to tighten the roll of polymer film, the roll of polymer film was considered to have no space.

When the innermost layer of the roll of polymer film was in close contact with the core and the layers of the polymer film on the inner peripheral side of the roll of polymer film were also in close contact with one another, the roll of polymer film was considered to have a gap(s) at and beyond a point at which, when the polymer film was rewound with a tension of 10N/m or more to tighten the roll of polymer film, the roll of polymer film was started to be tightened, and then the space was measured in the same manner as in <1> to <5>.

Example 1

Figure 4:
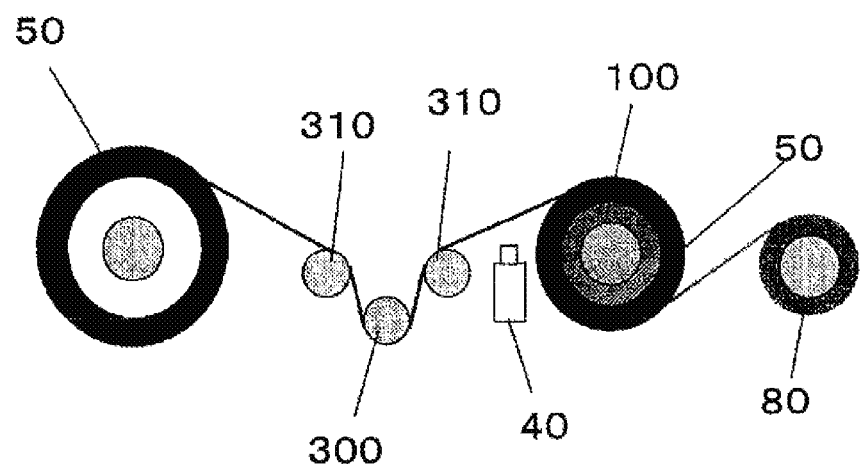
FIG. 4 is a drawing illustrating rewinding of a polymer film according to Example 1 of the present invention.
Figure 5:
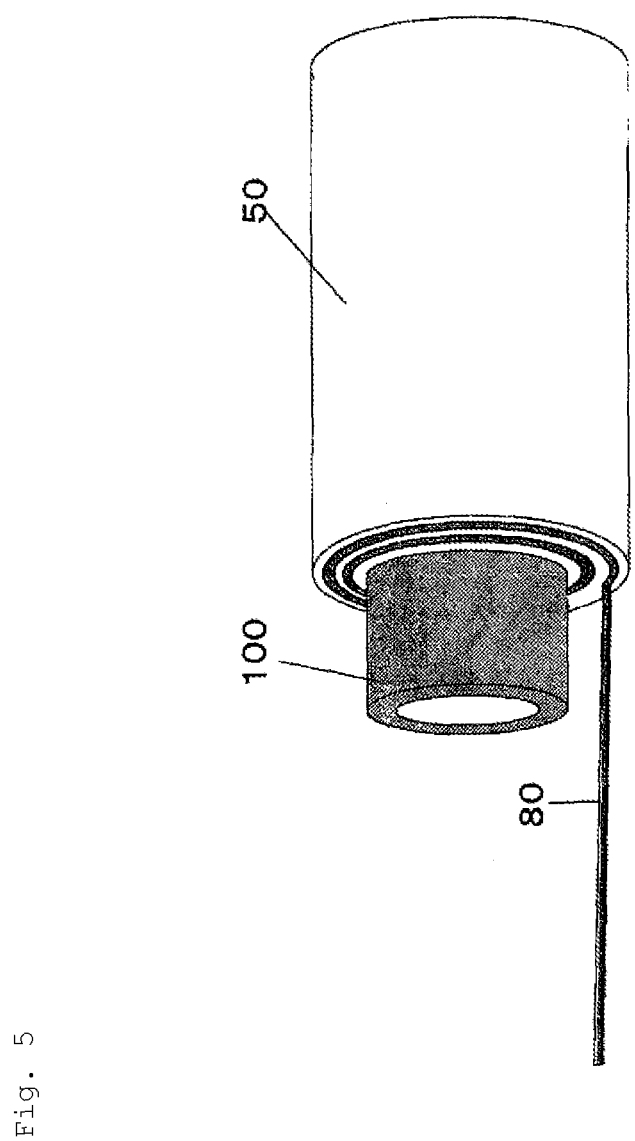
FIG. 5 is a drawing illustrating a method for removing a slip sheet according to Example 1 of the present invention.

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 50 m was prepared as a slip sheet 80. The polymer film 50 and the slip sheet 80 were rewound around a core 100 having a diameter of 100 mm using an apparatus shown in FIG. 4. At this time, two rolls of the slip sheet were prepared, and the first 50 m of the polymer film was wound up together with the two slip sheets in such a manner that the slip sheets were provided on both end sides of the polymer film and the last 50 m of the polymer film was wound up singly without using a slip sheet. As shown in FIG. 4, both the polymer film and the slip sheet were wound up under conditions of a tension of 20 N/m and a winding speed of 10 m/min while one of the surfaces of the film was dielectrified by a dielectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form, gaps between the layers of the polymer film.

In this way, gaps were formed in the inner peripheral-side half of the roll of polymer film to provide a space in the roll of polymer film. Each of the gaps was formed per pair of adjacent layers of the polymer film. The value of Ts/Tf inside the 50% cross-sectional circle of the roll of polymer film was 0.67, the value of Ts/Tf outside the circle was 0, and the value of Ts/Tf of the entire roll of polymer film was 0.34.

Figure 6:
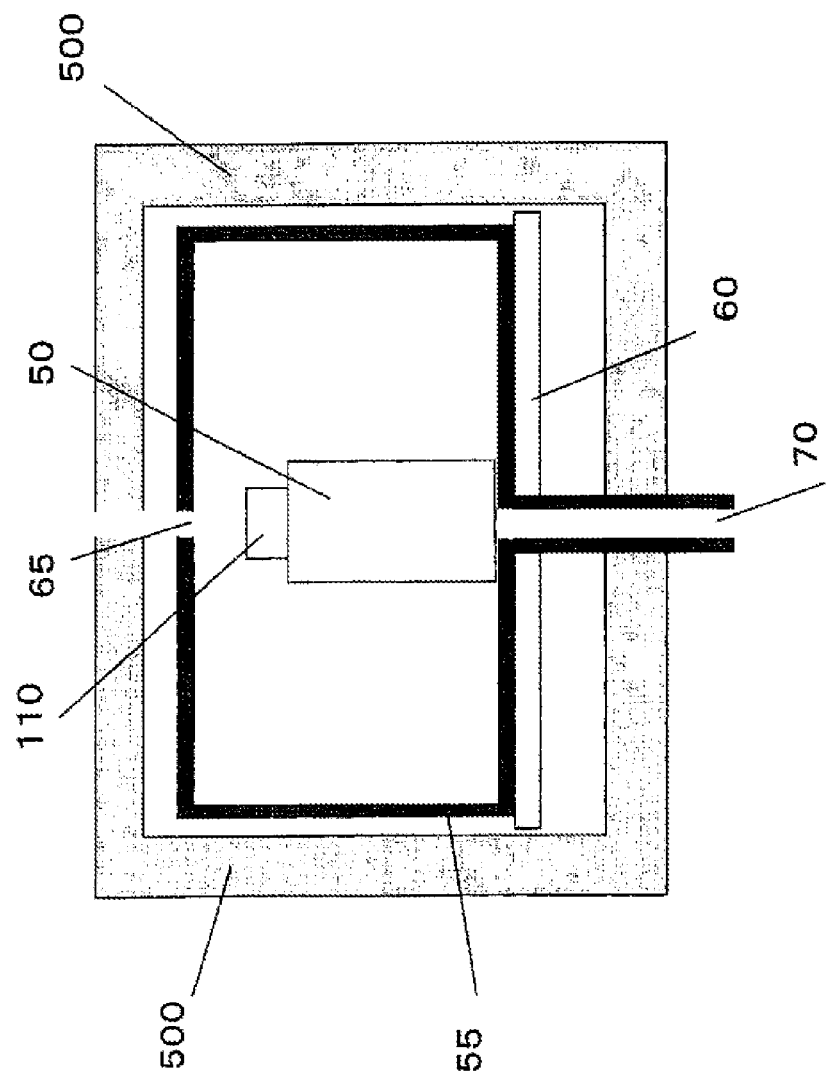
FIG. 6 is a drawing illustrating a heat treatment method according to Example 1 of the present invention.

Then, as shown in FIG. 6, the roll of polymer film having a space was vertically set together with the core 100 in an indirect heating furnace.

After the completion of setting, the adhesive tape used to fix the outermost layer of the roll of polymer film was removed, and a core 110 having a diameter of 60 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. In this example, the nitrogen gas was introduced through an inlet port 65 and exhaust was directed toward a pipe 70. Results are shown in Table 1.

Example 2

Example 2 was performed in the same manner as in Example 1 except that a PET film (thickness: 75 m) having a width of 25 mm and a length of 50 m was used as the slip sheet 80. The value of Ts/Tf inside the 50% cross-sectional circle of the roll of polymer film was 1.00, the value of Ts/Tf outside the circle was 0, and the value of Ts/Tf of the entire roll of polymer film was 0.50. Results are shown in Table Example 3

Example 3 was performed in the same manner as in Example 1 except that a PET film (thickness: 125 μm) having a width of 25 mm and a length of 50 m was used as the slip sheet 80. The value of Ts/Tf inside the 50% cross-sectional circle of the roll of polymer film was 1.67, the value of Ts/Tf outside the circle was 0, and the value of Ts/Tf of the entire roll of polymer film was 0.83. Results are shown in Table 1.

Comparative Example 1

Figure 7:
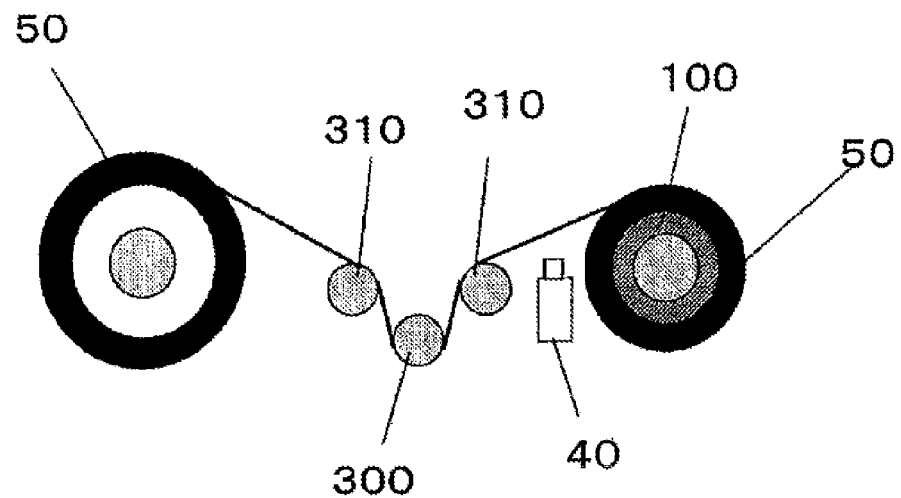
FIG. 7 is a drawing illustrating rewinding of a polymer film according to Comparative Example 1 of the present invention.

A polyimide film (trade name: APICAL 75AH film, thickness: 75 μm) manufactured by Kaneka Corporation and having a width of 250 mm and a length of 100 m was prepared as a polymer film 50, and as shown in FIG. 7, the polymer film 50 was rewound around a core 100 having a diameter of 100 mm. As shown in FIG. 7, the polymer film 50 was wound up under conditions of a tension of 80 N/m and a winding speed of 10 m/min while one of the surfaces of the film was diselectrified by a diselectrifier 40. It is to be noted that the tension was detected using a pick-up roller 300 shown in FIG. 7. The value of Ts/Tf of the entire roll of polymer film was 0. After the completion of winding, as shown in FIG. 6, the roll of polymer film was vertically set together with the core 100 in an indirect heating furnace. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. In this comparative example, the nitrogen gas was introduced through an inlet port 65 and exhaust was directed toward a pipe 70. Results are shown in Table 1.

Comparative Example 2

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 50 m was prepared as a slip sheet 80. As shown in FIG. 4, the polymer film 50 and the slip sheet 80 were rewound around a core 100 having a diameter of 100 mm. At this time, the first 50 m of the polymer film was wound up singly without using a slip sheet, and the last 50 m of the polymer film was wound up together with the two slip sheets in such a manner that the slip sheets were provided on both end sides of the polymer film. As shown in FIG. 4, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form gaps between the layers of the polymer film. In this way, gaps between the layers of the polymer film were formed in the outer peripheral-side half of the roll of polymer film to provide a space. The value of Ts/Tf inside the 50% cross-sectional circle of the roll of polymer film was 0, the value of Ts/Tf outside the circle was 0.67, and the value of Ts/Tf of the entire roll of polymer film was 0.34. Then, as shown in FIG. 6, the roll of polymer film having a space was vertically set together with the core 100 in an indirect heating furnace. After the completion of setting, the adhesive tape used to fix the outermost layer of the roll of polymer film was removed, and a core 110 having a diameter of 60 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. In this comparative example, the nitrogen gas was introduced through an inlet port 65 and exhaust was directed toward a pipe 70. Results are shown in Table 1.

Comparative Example 3

Comparative Example 3 was performed in the same manner as in Comparative Example 2 except that a PET film (thickness: 75 μm) having a width of 25 mm and a length of 50 m was used as the slip sheet 80. The value of Ts/Tf inside the 50% cross-sectional circle of the roll of polymer film was 0, the value of Ts/Tf outside the circle was 1.00, and the value of Ts/Tf of the entire roll of polymer film was 0.50. Results are shown in Table 1.

Comparative Example 4

Comparative Example 4 was performed in the same manner as in Comparative Example 2 except that a PET film (thickness: 125 μm) having a width of 25 mm and a length of 50 m was used as the slip sheet 80. The value of Ts/Tf inside the 50% cross-sectional circle of the roll of polymer film was 0, the value of Ts/Tf outside the circle was 1.67, and the value of Ts/Tf of the entire roll of polymer film was 0.83. Results are shown in Table 1.

TABLE 1

| | Polymer film | | | Inner diameter of roll (Rf) mm | Core | | Gap between layers of polymer film | | | Location where gaps were formed |
|---|---|---|---|---|---|---|---|---|---|---|
| | Thickness (Tf) μm | Length m | Width mm | | Diameter of core (Rs) mm | Rs/Rf | Gap (Ts) μm | Ts/Tf | Gap formation ratio % | |
| Example 1 | 75 | 100 | 250 | 100 | 100 | 1.00 | 50 | 0.67 | 50 | Inner peripheral side |
| Example 2 | 75 | 100 | 250 | 100 | 100 | 1.00 | 75 | 1.00 | 50 | Inner peripheral side |
| Example 3 | 75 | 100 | 250 | 100 | 100 | 1.00 | 125 | 1.67 | 50 | Inner peripheral side |
| Comparative Example 2 | 75 | 100 | 250 | 100 | 100 | 1.00 | 50 | 0.67 | 50 | Outer peripheral side |
| Comparative Example 3 | 75 | 100 | 250 | 100 | 100 | 1.00 | 75 | 1.00 | 50 | Outer peripheral side |
| Comparative Example 4 | 75 | 100 | 250 | 100 | 100 | 1.00 | 125 | 1.67 | 50 | Outer peripheral side |
| Comparative Example 1 | 75 | 100 | 250 | 100 | 100 | 1.00 | 0 | — | 0 | — |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 1 | Between layers of polymer film | 40 | 18 | D | A | 18 | D | A |
| Example 2 | Between layers of polymer film | 50 | 15 | D | A | 15 | D | A |
| Example 3 | Between layers of polymer film | 63 | 3 | B | C | 3 | B | C |
| Comparative Example 2 | Between layers of polymer film | 0 | 40 | E | C | 40 | E | C |
| Comparative Example 3 | Between layers of polymer film | 0 | 35 | E | C | 35 | E | C |
| Comparative Example 4 | Between layers of polymer film | 0 | 30 | E | D | 30 | E | D |
| Comparative Example 1 | — | 0 | 50 | E | A | 50 | E | A |

In Comparative Example 1 in which no space was provided in the roll of polymer film and Comparative Examples 2 to 4 in which a space was provided only in the outer peripheral-side half of the roll of polymer film, the number of layers where fusion bonding occurred was large. On the other hand, in Examples 1 to 3 in which a space was provided only in the inner peripheral-side half of the roll of polymer film, fusion bonding was significantly improved. Particularly, in Example 3 in which a larger space was provided by widening the gaps between the layers of the polymer film, fusion bonding was almost completely resolved while rippling occurred. From this, it can be said that the space exhibits the effect of suppressing fusion bonding when provided in the inner peripheral-side half of the roll of polymer film.

Example 4

A polyimide film (trade name: APICAL 75AH film, thickness: 75 μm) manufactured by Kaneka Corporation and having a width of 250 mm and a length of 100 m was prepared as a polymer film 50, and as shown in FIG. 7, the polymer film 50 was rewound around a core 100 having a diameter of 80 mm. As shown in FIG. 7, the polymer film 50 was wound up under conditions of a tension of 80 N/m and a winding speed of 10 m/min while one of the surfaces of the film was diselectrified by a diselectrifier 40. It is to be noted that the tension was detected using a pick-up roller 300 shown in FIG. 7. After the completion of winding, the roll of polymer film was placed inside a tube having an inner diameter of 130 mm, and the polymer film was rewound along the inside of the tube so that the layers of the polymer film were in close contact with one another. After the entire polymer film was rewound, the core 100 was removed to obtain a roll of polymer film having an inner diameter φ of 100 mm and no gap between the layers of the polymer film. The value of Ts/Tf of the entire roll of polymer film was 0. Then, as shown in FIG. 6, the roll of polymer film was vertically set in an indirect heating furnace and a core 110 having a diameter of 60 mm was placed at the center of the roll of polymer film. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 2.

Example 5

Example 5 was performed in the same manner as in Example 4 except that a core having a diameter of 70 mm was used as the core 110. The value of Ts/Tf of the entire roll of polymer film was 0. Results are shown in Table 2.

Example 6

Example 6 was performed in the same manner as in Example 4 except that a core having a diameter of 80 mm was used as the core 110. The value of Ts/Tf of the entire roll of polymer film was 0. Results are shown in Table 2.

Example 7

Example 7 was performed in the same manner as in Example 4 except that a core having a diameter of 83 mm was used as the core 110. The value of Ts/Tf of the entire roll of polymer film was 0. Results are shown in Table 2.

Example 8

Example 8 was performed in the same manner as in Example 4 except that a core having a diameter of 85 mm was used as the core 110. The value of Ts/Tf of the entire roll of polymer film was 0. Results are shown in Table 2.

Example 9

Example 9 was performed in the same manner as in Example 4 except that a core having a diameter of 88 mm was used as the core 110. The value of Ts/Tf of the entire roll of polymer film was 0. Results are shown in Table 2.

Example 10

Example 10 was performed in the same manner as in Example 4 except that a core having a diameter of 90 mm was used as the core 110. The value of Ts/Tf of the entire roll of polymer film was 0. Results are shown in Table 2.

TABLE 2

| | Polymer film | | | | Core | | Gap between layers of polymer film | | | |
| --- | --- | --- | --- | --- | --- | --- | --- | --- | --- | --- |
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 4 | 75 | 100 | 250 | 100 | 60 | 0.60 | 0 | — | 0 | — |
| Example 5 | 75 | 100 | 250 | 100 | 70 | 0.70 | 0 | — | 0 | — |
| Example 6 | 75 | 100 | 250 | 100 | 80 | 0.80 | 0 | — | 0 | — |
| Example 7 | 75 | 100 | 250 | 100 | 83 | 0.83 | 0 | — | 0 | — |
| Example 8 | 75 | 100 | 250 | 100 | 85 | 0.85 | 0 | — | 0 | — |
| Example 9 | 75 | 100 | 250 | 100 | 88 | 0.88 | 0 | — | 0 | — |
| Example 10 | 75 | 100 | 250 | 100 | 90 | 0.90 | 0 | — | 0 | — |
| Comparative Example 1 | 75 | 100 | 250 | 100 | 100 | 1.00 | 0 | — | 0 | — |

| | Space within 50% cross-sectional circle | | Evaluations | | | | | |
| --- | --- | --- | --- | --- | --- | --- | --- | --- |
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 4 | Between core and roll | 57 | 0 | A | C | 0 | A | C |
| Example 5 | Between core and roll | 52 | 0 | A | C | 0 | A | C |
| Example 6 | Between core and roll | 43 | 0 | A | B | 0 | A | B |
| Example 7 | Between core and roll | 39 | 3 | B | A | 3 | B | A |
| Example 8 | Between core and roll | 37 | 5 | B | A | 5 | B | A |
| Example 9 | Between core and roll | 32 | 8 | C | A | 8 | C | A |

TABLE 2-continued

| Example 10 | Between core and roll | 28 | 10 | C | A | 10 | C | A |
| Comparative Example 1 | — | | 0 | 50 | E | A | 50 | E | A |

It was found from the results shown in Table 2 that a significant fusion bonding-improving effect was exhibited by making the diameter of the core smaller than the inner diameter of the roll of polymer film, and the fusion bonding-improving effect was higher as compared to the cases shown in Table 1 where a space was provided by forming gaps between the layers of the polymer film. It was also found that fusion bonding could be further relieved by further reducing the ratio of the diameter of the core to the inner diameter of the roll of polymer film, and particularly, carbonization could be performed without the occurrence of fusion bonding by setting the diameter of the core so that the value of Rs/Rf was 0.80 or less. Further, as a result of comparison between Example 3 shown in Table 1 and Example 7, shown in Table 2, the number of layers where fusion bonding occurred was the same, but a higher rippling-improving effect was achieved in Example 7. From the result, it was found that both fusion bonding and rippling could be improved by using a method in which a space was provided by making the diameter of the core smaller than the inner diameter of the roll of polymer film.

Example 11

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 100 m was prepared as a slip sheet 80. As shown in FIG. 4, the polymer film 50 and the slip sheet 80 were rewound around a core 100 having a diameter of 100 mm. At this time, two rolls of the slip sheet were prepared, and the polymer film was wound up together with the two slip sheets in such a manner that the slip sheets were provided on both end sides of the polymer film. As shown in FIG. 4, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form gaps between the layers of the polymer film. The value of Ts/Tf inside the 50% cross-sectional circle of the roll of polymer film, the value of Ts/Tf outside the circle, and the value of Ts/Tf of the entire roll of polymer film were all 0.67. Then, the core 100 was removed, and the roll of polymer film having gaps was vertically set in an indirect heating furnace as shown in FIG. 6. After the completion of setting, the adhesive tape used to fix the outermost layer of the roll of polymer film was removed, and a core 110 having a diameter of 60 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 3.

Example 12

Example 12 was performed in the same manner as in Example 11 except that a core having a diameter of 70 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table Example 13

Example 13 was performed in the same manner as: in Example 11 except that a core having a diameter of 80 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table 3.

Example 14

Example 14 was performed in the same manner as in Example 11 except that a core having a diameter of 83 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table 3.

Example 15

Example 15 was performed in the same manner as in Example 11 except that a core having a diameter of 85 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table 3.

Example 16

Example 16 was performed in the same manner as in Example 11 except that a core having a diameter of 88 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table Example 17

Example 17 was performed in the same manner as in Example 11 except that a core having a diameter of 90 mm was used as the core 110. The value of Ts/Tf inside the 50% cross-sectional circle of the roll of polymer film, the value of Ts/Tf outside the circle, and the value of Ts/Tf of the entire roll of polymer film were all 0.67. Results are shown in Table 3.

Example 18

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 100 m was prepared as a slip sheet 80. As shown in FIG. 4, the polymer film 50 and the slip sheet 80 were rewound around a core 100 having a diameter of 100 mm. At this time, two rolls of the slip sheet were prepared, and the polymer film was wound up together with the two slip sheets in such a manner that the slip sheets were provided on both end sides of the polymer film. As shown in FIG. 4, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form gaps between the layers of the polymer film. The value of Ts/Tf inside the 50% cross-sectional circle of the roll of polymer film, the value of Ts/Tf outside the circle, and the value of Ts/Tf of the entire roll of polymer film were all 0.67. Then, the roll of polymer film having gaps was vertically set together with the core 100 in an indirect heating furnace as shown in FIG. 6, and the adhesive tape used to fix the outermost layer of the roll of polymer film was removed. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 3.

TABLE 3

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 11 | 75 | 100 | 250 | 100 | 60 | 0.60 | 50 | 0.67 | 100 | Entire roll |
| Example 12 | 75 | 100 | 250 | 100 | 70 | 0.70 | 50 | 0.67 | 100 | Entire roll |
| Example 13 | 75 | 100 | 250 | 100 | 80 | 0.80 | 50 | 0.67 | 100 | Entire roll |
| Example 14 | 75 | 100 | 250 | 100 | 83 | 0.83 | 50 | 0.67 | 100 | Entire roll |
| Example 15 | 75 | 100 | 250 | 100 | 85 | 0.85 | 50 | 0.67 | 100 | Entire roll |
| Example 16 | 75 | 100 | 250 | 100 | 88 | 0.88 | 50 | 0.67 | 100 | Entire roll |
| Example 17 | 75 | 100 | 250 | 100 | 90 | 0.90 | 50 | 0.67 | 100 | Entire roll |
| Example 18 | 75 | 100 | 250 | 100 | 100 | 1.00 | 50 | 0.67 | 100 | Entire roll |

| | Space within 50% cross-sectional circle | | Evaluations | | | |
|---|---|---|---|---|---|---|
| | | | Carbonaceous film | | Graphite film | |
| | | | Fusion bonding | | Fusion bonding | |
| | Location where space was formed | Ratio of space % | Number of layers where fusion bonding occurred | Rippling | Number of layers where fusion bonding occurred | Rippling |
| Example 11 | Between core and roll and between layers of polymer film | 67 | 0 | A    C | 0 | A    C |
| Example 12 | Between core and roll and between layers of polymer film | 63 | 0 | A    C | 0 | A    C |
| Example 13 | Between core and roll and between layers of polymer film | 59 | 0 | A    B | 0 | A    B |

TABLE 3-continued

| | | | | | | | | |
|---|---|---|---|---|---|---|---|---|
| Example 14 | Between core and roll and between layers of polymer film | 57 | 0 | A | A | 0 | A | A |
| Example 15 | Between core and roll and between layers of polymer film | 56 | 0 | A | A | 0 | A | A |
| Example 16 | Between core and roll and between layers of polymer film | 53 | 5 | B | A | 5 | B | A |
| Example 17 | Between core and roll and between layers of polymer film | 52 | 8 | C | A | 8 | C | A |
| Example 18 | Between layers of polymer film | 40 | 15 | D | A | 15 | D | A |

In Examples shown in Table 3, carbonization was performed on the roll of polymer film in which the diameter of the core was made smaller than the inner diameter of the roll of polymer film and, in addition, gaps were provided between the layers of the polymer film so that the value of Ts/Tf of the entire roll of polymer film was 0.67.

As can be seen from the results shown in Table 2, when no gap was provided between the layers of the polymer film, carbonization could be performed without the occurrence of fusion bonding but rippling could not be completely resolved. However, as shown in Table 3, both fusion bonding and rippling could be suppressed not only by making the diameter of the core smaller than the inner diameter of the roll of polymer film but also by forming gaps between the layers of the polymer film.

As can be seen from the comparison between Example 18 and Examples 11 to 17, a fusion bonding-improving effect is more significantly exhibited when a space is provided not only by forming gaps between the layers of the polymer film but also by making the diameter of the core smaller than the inner diameter of the roll of polymer film than when a space is provided simply by forming gaps between the layers of the polymer film.

As in the case of Table 2, it is apparent from the results shown in Table 3 that fusion bonding can be further relieved by further reducing the ratio of the diameter of the core to the inner diameter of the roll of polymer film. However, when the value of Rs/Rf was 0.80 or less, rippling slightly occurred.

Example 19

A polyimide film (trade name: APICAL 75AH film, thickness: 75 µm) manufactured by Kaneka Corporation and having a width of 250 mm and a length of 100 m was prepared as a polymer film 50, and a PET film (thickness: 75 µm) having a width of 25 mm and a length of 100 m was prepared as a slip sheet 80. As shown in FIG. 4, the polymer film 50 and the slip sheet 80 were rewound around a core 100 having a diameter of 100 mm. At this time, two rolls of the slip sheet were prepared, and the polymer film was wound up together with the two slip sheets in such a manner that the slip sheets were provided on both end sides of the polymer film. As shown in FIG. 4, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form gaps between the layers of the polymer film. The value of Ts/Tf inside the 50% cross-sectional circle of the roll of polymer film, the value of Ts/Tf outside the circle, and the value of Ts/Tf of the entire roll of polymer film were all 1.00. Then, the core 100 was removed, and the roll of polymer film having gaps was vertically set in an indirect heating furnace as shown in FIG. 6. After the completion of setting, the adhesive tape used to fix the outermost layer of the roll of polymer film was removed, and a core 110 having a diameter of 80 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 4.

Example 20

Example 20 was performed in the same manner as in Example 19 except that a core having a diameter of 83 mm was used as the core 110. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

Example 21

Example 21 was performed in the same manner as in Example 19 except that a core having a diameter of 85 mm was used as the core 110. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

Example 22

Example 22 was performed in the same manner as in Example 19 except that a core having a diameter of 88 mm was used as the core 110. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

Example 23

Example 23 was performed in the same manner as in Example 19 except that a core having a diameter of 90 mm was used as the core 110. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

Example 24

Example 24 was performed in the same manner as in Example 18 except that a PET film (thickness: 75 m) having a width of 25 mm and a length of 100 m was used as the slip sheet 80. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

Example 25

Example 25 was performed in the same manner as in Example 19 except that after the core 100 was removed, heat treatment was performed without placing the core 110 at the center of the roll of polymer film. The value of Ts/Tf inside the 50% cross-sectional circle of the roll of polymer film, the value of Ts/Tf outside the circle, and the value of Ts/Tf of the entire roll of polymer film were all 1.00. Results are shown in Table 4.

TABLE 4

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 19 | 75 | 100 | 250 | 100 | 80 | 0.80 | 75 | 1.00 | 100 | Entire roll |
| Example 20 | 75 | 100 | 250 | 100 | 83 | 0.83 | 75 | 1.00 | 100 | Entire roll |
| Example 21 | 75 | 100 | 250 | 100 | 85 | 0.85 | 75 | 1.00 | 100 | Entire roll |
| Example 22 | 75 | 100 | 250 | 100 | 88 | 0.88 | 75 | 1.00 | 100 | Entire roll |
| Example 23 | 75 | 100 | 250 | 100 | 90 | 0.90 | 75 | 1.00 | 100 | Entire roll |
| Example 24 | 75 | 100 | 250 | 100 | 100 | 1.00 | 75 | 1.00 | 100 | Entire roll |
| Example 25 | 75 | 100 | 250 | 100 | 0 | — | 75 | 1.00 | 100 | Entire roll |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 19 | Between core and roll and between layers of polymer film | 64 | 0 | A | C | 0 | A | C |
| Example 20 | Between core and roll and between layers of polymer film | 62 | 0 | A | B | 0 | A | B |
| Example 21 | Between core and roll and between layers of polymer film | 61 | 0 | A | B | 0 | A | B |
| Example 22 | Between core and roll and between layers of polymer film | 60 | 3 | B | B | 3 | B | B |
| Example 23 | Between core and roll and between layers of polymer film | 58 | 5 | B | B | 5 | B | B |

TABLE 4-continued

| | | | | | | | | |
|---|---|---|---|---|---|---|---|---|
| Example 24 | Between layers of polymer film | 50 | 13 | D | B | 13 | D | B |
| Example 25 | Between core and roll and between layers of polymer film | 76 | 0 | A | D | 0 | A | D |

As shown in Table 4, carbonization was performed on the roll of polymer film in which the diameter of the core was made smaller than the inner diameter of the roll of polymer film and, in addition, gaps were provided between the layers of the polymer film so that the value of Ts/Tf of the entire roll of polymer film was 1.00.

As a result, as in the case of Table 3, the occurrence of fusion bonding could be prevented by setting the value of Rs/Rf to 0.85 or less (Examples 19 to 21). However, as can be seen from the comparison between Examples 13 to 17 and Examples 19 to 23, rippling is more likely to occur when the value of Ts/Tf is 1.00 than when the value of Ts/Tf is 0.67. As shown in Table 3, when the value of Ts/Tf was 0.67, both fusion bonding and rippling were resolved by setting the value of Rs/Rf to 0.83 to 0.85 (Examples 14 and 15), but as shown in Table 4, when the value of Ts/Tf was 1.00, fusion bonding was resolved but rippling was not completely resolved. It is found from the results that it is also important to optimize the gaps between the layers of the polymer film to resolve both fusion bonding and rippling.

It is to be noted that in Example 25 in which carbonization was performed without using a core, fusion bonding did not occur while significant rippling occurred.

Example 26

A polyimide film (trade name: APICAL 200AV film, thickness: 50 μm) manufactured by Kaneka Corporation and having a width of 250 mm and a length of 150 m was prepared as a polymer film 50, and a PET film (thickness: 37 μm) having a width of 25 mm and a length of 150 m was prepared as a slip sheet 80. As shown in FIG. 4, the polymer film 50 and the slip sheet 80 were rewound around a core 100 having a diameter of 100 mm. At this time, two rolls of the slip sheet were prepared, and the polymer film was wound up together with the two slip sheets in such a manner that the slip sheets were provided on both end sides of the polymer film. As shown in FIG. 4, both the polymer film and the slip sheet were wound up under conditions of a tension of 20 N/m and a winding speed of 10 m/min while one of the surfaces of the polymer film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 5 to form gaps between the layers of the polymer film. The value of Ts/Tf inside the 50% cross-sectional circle of the roll of polymer film, the value of Ts/Tf outside the circle, and the value of Ts/Tf of the entire roll of polymer film were all 0.74. Then, the core 100 was removed, and the roll of polymer film having gaps was vertically set in an indirect heating furnace as shown in FIG. 6. After the completion of setting, the adhesive tape used to fix the outermost layer of the roll of polymer film was removed, and a core 110 having a diameter of 80 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 5.

Example 27

Example 27 was performed in the same manner as in Example 26 except that a core having a diameter of 83 mm was used as the core 110. The value of Ts/Tf inside the 50% cross-sectional circle of the roll of polymer film, the value of Ts/Tf outside the circle, and the value of Ts/Tf of the entire roll of polymer film were all 0.74. Results are shown in Table 5.

Example 28

Example 28 was performed in the same manner as in Example 26 except that a core having a diameter of 85 mm was used as the core 110. The value of Ts/Tf inside the 50% cross-sectional circle of the roll of polymer film, the value of Ts/Tf outside the circle, and the value of Ts/Tf of the entire roll of polymer film were all 0.74. Results are shown in Table 5.

Example 29

Example 29 was performed in the same manner as in Example 28 except that a PET film (thickness: 25 μm) having a width of 25 mm and a length of 150 m was used as the slip sheet 80. The value of Ts/Tf inside the 50% cross-sectional circle of the roll of polymer film, the value of Ts/Tf outside the circle, and the value of Ts/Tf of the entire roll of polymer film were all 0.50. Results are shown in Table 5.

Example 30

Example 30 was performed in the same manner as in Example 28 except that a PET film (thickness: 12.5 μm) having a width of 25 mm and a length of 150 m was used as the slip sheet 80. The value of Ts/Tf inside the 50% cross-sectional circle of the roll of polymer film, the value of Ts/Tf outside the circle, and the value of Ts/Tf of the entire roll of polymer film were all 0.25. Results are shown in Table 5.

Example 31

Example 31 was performed in the same manner as in Example 8 except that a polyimide film (trade name: APICAL 200AV film, thickness: 50 μm) manufactured by Kaneka Corporation and having a width of 250 mm and a length of 150 m was used as the polymer film 50. The value of Ts/Tf of the entire roll of polymer film was 0. Results are shown in Table 5.

Example 32

Example 32 was performed in the same manner as in Example 28 except that a PET film (thickness: 50 μm) having a width of 25 mm and a length of 150 m was used as the slip sheet 80. The value of Ts/Tf inside the 50% cross-sectional circle of the roll of polymer film, the value of Ts/Tf outside the circle, and the value of Ts/Tf of the entire roll of polymer film were all 1.00. Results are shown in Table 5.

Example 33

Example 33 was performed in the same manner as in Example 28 except that a PET film (thickness: 75 μm) having a width of 25 mm and a length of 150 m was used as the slip sheet 80. The value of Ts/Tf inside the 50% cross-sectional circle of the roll of polymer film, the value of Ts/Tf outside the circle, and the value of Ts/Tf of the entire roll of polymer film were all 1.50. Results are shown in Table 5.

Comparative Example 5

Comparative Example 5 was performed in the same manner as in Comparative Example 1 except that a polyimide film (trade name: APICAL 200AV film, thickness: 50 μm) manufactured by Kaneka Corporation and having a width of 250 mm and a length of 150 m was used as the polymer film 50. The value of Ts/Tf of the entire roll of polymer film was 0. Results are shown in Table 5.

TABLE 5

| | Polymer film | | | Inner diameter of roll (Rf) mm | Core | | Gap between layers of polymer film | | | |
|---|---|---|---|---|---|---|---|---|---|---|
| | Thickness (Tf) μm | Length m | Width mm | | Diameter of core (Rs) mm | Rs/Rf | Gap (Ts) μm | Ts/Tf | Gap formation ratio % | Location where gaps were formed |
| Example 26 | 50 | 150 | 250 | 100 | 80 | 0.80 | 37 | 0.74 | 100 | Entire roll |
| Example 27 | 50 | 150 | 250 | 100 | 83 | 0.83 | 37 | 0.74 | 100 | Entire roll |
| Example 28 | 50 | 150 | 250 | 100 | 85 | 0.85 | 37 | 0.74 | 100 | Entire roll |
| Example 29 | 50 | 150 | 250 | 100 | 85 | 0.85 | 25 | 0.50 | 100 | Entire roll |
| Example 30 | 50 | 150 | 250 | 100 | 85 | 0.85 | 12.5 | 0.25 | 100 | Entire roll |
| Example 31 | 50 | 150 | 250 | 100 | 85 | 0.85 | 0 | — | 0 | — |
| Comparative Example 5 | 50 | 150 | 250 | 100 | 100 | 1.00 | 0 | — | 0 | — |
| Example 32 | 50 | 150 | 250 | 100 | 85 | 0.85 | 50 | 1.00 | 100 | Entire roll |
| Example 33 | 50 | 150 | 250 | 100 | 85 | 0.85 | 75 | 1.50 | 100 | Entire roll |

| | Space within 50% cross-sectional circle | | Evaluations | | | |
|---|---|---|---|---|---|---|
| | | | Carbonaceous film Fusion bonding | | Graphite film Fusion bonding | |
| | Location where space was formed | Ratio of space % | Number of layers where fusion bonding occurred | Rippling | Number of layers where fusion bonding occurred | Rippling |
| Example 26 | Between core and roll and between layers of polymer film | 60 | 0 | A | B | 0 | A | B |
| Example 27 | Between core and roll and between layers of polymer film | 58 | 0 | A | A | 0 | A | A |
| Example 28 | Between core and roll and between layers of polymer film | 57 | 0 | A | A | 0 | A | A |
| Example 29 | Between core and roll and between layers of polymer film | 52 | 0 | A | A | 0 | A | A |
| Example 30 | Between core and roll and between layers of polymer film | 45 | 5 | B | A | 5 | B | A |

TABLE 5-continued

| | | | | | | | | |
|---|---|---|---|---|---|---|---|---|
| Example 31 | Between core and roll | 37 | 5 | B | A | 5 | B | A |
| Comparative Example 5 | — | | 0 | 50 | E | A | 50 | E | A |
| Example 32 | Between core and roll and between layers of polymer film | 61 | 0 | A | B | 0 | A | B |
| Example 33 | Between core and roll and between layers of polymer film | 68 | 0 | A | C | 0 | A | C |

The results obtained when the polymer film having a thickness of 50 μm was used were the same as those obtained when the polymer film having a thickness of 75 μm was used.

In Example 31, the diameter of the core was made smaller than the inner diameter of the roll of polymer film so that the value of Rs/Rf was 0.85, which significantly improved fusion bonding as compared to Comparative Example 5 in which no space was provided in the roll of polymer film. The occurrence of fusion bonding was further suppressed not only by making the diameter of the core smaller than the inner diameter of the roll of polymer film but also by providing gaps between the layers of the polymer film (Examples 28 and 29). However, the degree of the occurrence of fusion bonding in Example 30 in which the thickness of the gap between the layers of the polymer film was small (Ts/Tf=0.25) was the same as that in Example 31 in which no gap was provided between the layers of the polymer film. Further, it was also found that when the value of Ts/Tf was 1.00 or higher, rippling started to occur.

Example 34

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 50 m was prepared as a slip sheet 80. As shown in FIG. 4, the polymer film 50 and the slip sheet 80 were rewound around a core 100 having a diameter of 100 mm. At this time, two rolls of the slip sheet were prepared, and the first 50 m of the polymer film was wound up together with the two slip sheets in such a manner that the slip sheets were provided on both end sides of the polymer film and the last 50 m of the polymer film was wound up singly without using a slip sheet. As shown in FIG. 4, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 4. After the completion of winding, the outermost layer of the roll of polymer film was fixed with an adhesive tape to prevent loosening, and the slip sheets 80 were started to be removed from the outer peripheral side of the roll of polymer film as shown in FIG. 8 to form gaps between the layers of the polymer film. In this way, gaps between the layers of the polymer film were formed in the inner peripheral-side half of the roll of polymer film to provide a space. The value of Ts/Tf inside the 50% cross-sectional circle of the roll of polymer film was 0.67, the value of Ts/Tf outside the circle was 0, and the value of Ts/Tf of the entire roll of polymer film was 0.34. Then, the core 100 was removed, and the roll of polymer film having gaps was vertically set in an indirect heating furnace as shown in FIG. 6. After the completion of setting, the adhesive tape used to fix the outermost layer of the roll of polymer film was removed, and a core 110 having a diameter of 85 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 6.

Example 35

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 30 m was prepared as a slip sheet 80. As shown in FIG. 4, the polymer film 50 and the slip sheet 80 were rewound around a core 100 having a diameter of 100 mm. At this time, two rolls of the slip sheet were prepared, and the first 30 m of the polymer film was wound up together with the two slip sheets in such a manner that the slip sheets were provided on both end sides of the polymer film, and the last 70 m of the polymer film was wound up singly without using a slip sheet. Example 35 was performed in the same manner as in Example 34 except for the above. The value of Ts/Tf inside the cross-sectional circle (30% cross-sectional circle) of the roll of polymer film whose center was at the center of the roll of polymer film and whose circumference passed through a point at which the length of the polymer film from the inner end thereof was 30% of the total length of the polymer film was 0.67, the value of Ts/Tf inside the 50% cross-sectional circle of the roll of polymer film was 0.40, the value of Ts/Tf outside the 50% cross-sectional circle was 0, and the value of Ts/Tf of the entire roll of polymer film was 0.20. Results are shown in Table 6.

Example 36

A polyimide film (trade name: APICAL 75AH film, thickness: 75 μm) manufactured by Kaneka Corporation and having a width of 250 mm and a length of 100 m was prepared as a polymer film 50, and a PET film (thickness: 50 μm) having a width of 25 mm and a length of 50 m was prepared as a slip sheet 80. As shown in FIG. 4, the polymer film 50 and the slip sheet 80 were rewound around a core 100 having a diameter of 100 mm. At this time, the first 50 m of the polymer film was wound up singly without using a slip sheet, and the last 50 m of the polymer film was wound up together with the two slip sheets in such a manner that the slip sheets were provided on both end sides of the polymer film. Example 36 was performed in the same manner as in Example 34 except for the above. The value of Ts/Tf inside the 50% cross-sectional circle of the roll of polymer film was 0, the value of Ts/Tf outside the 50% cross-sectional circle was 0.67, and the value of Ts/Tf of the entire roll of polymer film was 0.34. Results are shown in Table 6.

Example 37

Example 37 was performed in the same manner as in Example 15 except that a polyimide film (trade name: APICAL 75AH film, thickness: 75 μm) manufactured by Kaneka Corporation and having a width of 100 mm and a length of 100 m was used as the polymer film 50. The value of Ts/Tf inside the 50% cross-sectional circle of the roll of polymer film, the value of Ts/Tf outside the 50% cross-sectional circle,

TABLE 6

| | Polymer film | | | | Core | | Gap between layers of polymer film | | |
|---|---|---|---|---|---|---|---|---|---|
| | | | | Inner | | | | | |
| | Thickness (Tf) μm | Length m | Width mm | diameter of roll (Rf) mm | Diameter of core (Rs) mm | Rs/Rf | Gap (Ts) μm | Ts/Tf | Gap formation ratio % | Location where gaps were formed |
| Example 15 | 75 | 100 | 250 | 100 | 85 | 0.85 | 50 | 0.67 | 100 | Entire roll |
| Example 34 | 75 | 100 | 100 | 100 | 85 | 0.85 | 50 | 0.67 | 50 | Inner peripheral side |
| Example 35 | 75 | 100 | 100 | 100 | 85 | 0.85 | 50 | 0.67 | 30 | Inner peripheral side |
| Example 36 | 75 | 100 | 100 | 100 | 85 | 0.85 | 50 | 0.67 | 50 | Outer peripheral side |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 15 | Between core and roll and between layers of polymer film | 56 | 0 | A | A | 0 | A | A |
| Example 34 | Between core and roll and between layers of polymer film | 56 | 0 | A | A | 0 | A | A |
| Example 35 | Between core and roll and between layers of polymer film | 56 | 5 | B | A | 5 | B | A |
| Example 36 | Between core and roll | 37 | 5 | B | A | 5 | B | A |

As can be seen from the comparison between Example 34 and Example 36, when the diameter of the core is made smaller than the inner diameter of the roll of polymer film, gaps between the layers of the polymer film are preferably formed on the inner peripheral side of the roll of polymer film. Further, it was found from the comparison between Example 34 and Example 35 that a higher fusion bonding-improving effect was obtained when the ratio of layers of the polymer film between which a gap was provided to the total layers of the polymer film of the roll of polymer film was 50% or higher.

and the value of Ts/Tf of the entire roll of polymer film were all 0.67. Results are shown in Table 7.

Example 38

Example 38 was performed in the same manner as in Example 15 except that a polyimide film (trade name: APICAL 75AH film, thickness: 75 μm) manufactured by Kaneka Corporation and having a width of 500 mm and a length of 100 m was used as the polymer film 50. The value of Ts/Tf inside the 50% cross-sectional circle of the roll of polymer film, the value of Ts/Tf outside the 50% cross-sectional circle, and the value of Ts/Tf of the entire roll of polymer film were all 0.67. Results are shown in Table 7.

TABLE 7

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 37 | 75 | 100 | 100 | 100 | 85 | 0.85 | 50 | 0.67 | 100 | Entire roll |
| Example 15 | 75 | 100 | 250 | 100 | 85 | 0.85 | 50 | 0.67 | 100 | Entire roll |
| Example 38 | 75 | 100 | 500 | 100 | 85 | 0.85 | 50 | 0.67 | 100 | Entire roll |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 37 | Between core and roll and between layers of polymer film | 56 | 0 | A | A | 0 | A | A |
| Example 15 | Between core and roll and between layers of polymer film | 56 | 0 | A | A | 0 | A | A |
| Example 38 | Between core and roll and between layers of polymer film | 56 | 0 | A | A | 0 | A | A |

The polymer film could be satisfactorily carbonized both when the polymer film had a width of 100 mm and when the polymer film had a width of 500 mm.

Example 39

Example 39 was performed in the same manner as in Example 15 except that a polyimide film (trade name: APICAL 75AH film, thickness: 75 μm) manufactured by Kaneka Corporation and having a width of 250 mm and a length of 50 m was used as the polymer film 50. The value of Ts/Tf inside the 50% cross-sectional circle of the roll of polymer film, the value of Ts/Tf outside the 50% cross-sectional circle, and the value of Ts/Tf of the entire roll of polymer film were all 0.67. Results are shown in Table 8.

Example 40

Example 40 was performed in the same manner as in Example 15 except that a polyimide film (trade name: APICAL 75AH film, thickness: 75 μm) manufactured by Kaneka Corporation and having a width of 250 mm and a length of 150 m was used as the polymer film 50. The value of Ts/Tf inside the 50% cross-sectional circle of the roll of polymer film, the value of Ts/Tf outside the 50% cross-sectional circle, and the value of Ts/Tf of the entire roll of polymer film were all 0.67. Results are shown in Table 8.

TABLE 8

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 39 | 75 | 50 | 250 | 100 | 85 | 0.85 | 50 | 0.67 | 100 | Entire roll |
| Example 15 | 75 | 100 | 250 | 100 | 85 | 0.85 | 50 | 0.67 | 100 | Entire roll |
| Example 40 | 75 | 150 | 250 | 100 | 85 | 0.85 | 50 | 0.67 | 100 | Entire roll |

TABLE 8-continued

| | Space within 50% cross-sectional circle | | Evaluations | | | | |
|---|---|---|---|---|---|---|---|
| | | | Carbonaceous film | | | Graphite film | |
| | | | Fusion bonding | | | Fusion bonding | |
| | Location where space was formed | Ratio of space % | Number of layers where fusion bonding occurred | | Rippling | Number of layers where fusion bonding occurred | Rippling |
| Example 39 | Between core and roll and between layers of polymer film | 65 | 0 | A | A | 0 | A | A |
| Example 15 | Between core and roll and between layers of polymer film | 56 | 0 | A | A | 0 | A | A |
| Example 40 | Between core and roll and between layers of polymer film | 51 | 0 | A | A | 0 | A | A |

The polymer film could be satisfactorily carbonized both when the polymer film was as long as 150 m and when the polymer film was as short as 50 m.

Example 41

Example 41 was performed in the same manner as in Example 15 except that a core having a diameter of 120 mm was used as the core 100 and a core having a diameter of 102 mm was used as the core 110. The value of Ts/Tf inside the 50% cross-sectional circle of the roll of polymer film, the value of Ts/Tf outside the 50% cross-sectional circle, and the value of Ts/Tf of the entire roll of polymer film were all 0.67. Results are shown in Table 9.

TABLE 9

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Example 41 | 75 | 100 | 250 | 120 | 102 | 0.85 | 50 | 0.67 | 100 | Entire roll |
| Example 15 | 75 | 100 | 250 | 100 | 85 | 0.85 | 50 | 0.67 | 100 | Entire roll |

| | Space within 50% cross-sectional circle | | Evaluations | | | | |
|---|---|---|---|---|---|---|---|
| | | | Carbonaceous film | | | Graphite film | |
| | | | Fusion bonding | | | Fusion bonding | |
| | Location where space was formed | Ratio of space % | Number of layers where fusion bonding occurred | | Rippling | Number of layers where fusion bonding occurred | Rippling |
| Example 41 | Between core and roll and between layers of polymer film | 60 | 0 | A | A | 0 | A | A |
| Example 15 | Between core and roll and between layers of polymer film | 56 | 0 | A | A | 0 | A | A |

Even when a core having a diameter of 120 mm was used, the same results as Example 15 could be obtained by setting the value of Rs/Rf to 0.85.

Example 42

A polyimide film (trade name: APICAL 75AH film, thickness: 75 μm) manufactured by Kaneka Corporation and having a width of 250 mm and a length of 100 m was prepared as a polymer film 50, and as shown in FIG. 7, the polymer film 50 was rewound around the center of a core 100 having a diameter of 100 mm and a length of 300 mm. As shown in FIG. 7, the polymer film was wound up under conditions of a tension of 80 N/m and a winding speed of 10 m/min while one of the surfaces of the film was diselectrified by a diselectrifier 40. It is to be noted that the tension was detected using a pick-up roller 300 shown in FIG. 7. After the completion of winding, the roll of polymer film was vertically set together with the core 100 as shown in FIG. 10, and a tube having an inner diameter of 134 mm was further set outside the roll of polymer film and the polymer film was rewound in a direction opposite to the winding direction of the polymer film to form gaps between the layers of the polymer film. Just after the formation of the gaps, all the gaps formed between the layers of the polymer film were almost uniform in size. The value of Ts/Tf inside the 50% cross-sectional circle of the roll of polymer film, the value of Ts/Tf outside the 50% cross-sectional circle, and the value of Ts/Tf of the entire roll of polymer film were all 0.67.

Then, as shown in FIG. 6, the roll of polymer film having a space was vertically set together with the core 100 in an indirect heating furnace.

After the completion of setting, a core 110 having a diameter of 60 mm was newly placed at the center of the roll of polymer film. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. In this example, the nitrogen gas was introduced through an inlet port 65 and exhaust was directed toward a pipe 70. Results are shown in Table 10.

TABLE 10

| | Polymer film | | | | Core | | Gap between layers of polymer film | | | |
|---|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed | Gap formation method |
| Example 15 | 75 | 100 | 250 | 100 | 85 | 0.85 | 50 | 0.67 | 100 | Entire roll | Insertion of slip sheet |
| Example 42 | 75 | 100 | 250 | 100 | 85 | 0.85 | 50 | 0.67 | 100 | Entire roll | Rewinding |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Example 15 | Between core and roll and between layers of polymer film | 56 | 0 | A | A | 0 | A | A |
| Example 42 | Between core and roll and between layers of polymer film | 56 | 0 | A | B | 0 | A | B |

As in the case of Example 15 in which gaps were formed between the layers of the polymer film using the slip sheets, carbonization could be performed without the occurrence of fusion bonding also in Example 42 in which gaps were formed between the layers of the polymer film by rewinding. However, the gaps between the layers of the polymer film were slightly non-uniform in size, and therefore rippling slightly occurred.

Comparative Example 6

Comparative Example 6 was performed in the same manner as in Example 1 except that a PET film (thickness: 20 μm) having a width of 25 mm and a length of 50 m was used as the slip sheet 80. Results are shown in Table 11.

Comparative Example 7

Comparative Example 7 was performed in the same manner as in Example 4 except that a core having a diameter of 95 mm was used as the core 110. Results are shown in Table 11.

Comparative Example 8

Comparative Example 8 was performed in the same manner as in Example 11 except that a core having a diameter of 97 mm was used as the core 110 and a PET film (thickness: 10 m) having a width of 25 mm and a length of 50 m was used as the slip sheet 80. Results are shown in Table 11.

65 Inlet port
70 Discharge port
80 Slip sheet

TABLE 11

| | Polymer film | | | | Core | | Gap between layers of polymer film | | |
|---|---|---|---|---|---|---|---|---|---|
| | Thickness (Tf) μm | Length m | Width mm | Inner diameter of roll (Rf) mm | Diameter of core (Rs) mm | Rs/Rf | Gap (Ts) μm | Ts/Tf | Gap formation ratio % | Location where gaps were formed |
| Comparative Example 6 | 75 | 100 | 250 | 100 | 100 | 1.00 | 20 | 0.27 | 50 | Inner peripheral side |
| Comparative Example 7 | 75 | 100 | 250 | 100 | 95 | 0.95 | 0 | — | 0 | — |
| Comparative Example 8 | 75 | 100 | 250 | 100 | 97 | 0.97 | 10 | 0.13 | 100 | Entire roll |

| | Space within 50% cross-sectional circle | | Evaluations | | | | | |
|---|---|---|---|---|---|---|---|---|
| | | | Carbonaceous film | | | Graphite film | | |
| | | | Fusion bonding | | | Fusion bonding | | |
| | Location where space was formed | Ratio of space % | Number of layers where fusion bonding occurred | | Rippling | Number of layers where fusion bonding occurred | | Rippling |
| Comparative Example 6 | Between layers of polymer film | 21 | 25 | E | A | 25 | E | A |
| Comparative Example 7 | Between core and roll | 17 | 30 | E | A | 30 | E | A |
| Comparative Example 8 | Between core and roll and between layers of polymer film | 20 | 30 | E | A | 30 | E | A |

In Comparative Example 6, gaps between the layers of the polymer film were formed as a space within 50% cross-sectional circle so that the ratio of the space within 50% cross-sectional circle was 21%, but the ratio of the space was too low to improve fusion bonding. In Comparative Example 7 in which a space within 50% cross-sectional circle was provided between the core and the innermost layer of the roll of polymer film, the ratio of the space within 50% cross-sectional circle was as low as 17% and therefore fusion bonding occurred in as many as 30 layers. In Comparative Example 8, a space was provided not only by forming gaps between the layers of the polymer film but also by forming a space between the core and the innermost layer of the roll of polymer film, but fusion bonding occurred in many layers because the ratio of the space within 50% cross-sectional circle was as low as 20%.

DESCRIPTION OF REFERENCE NUMERALS

1 Center of roll of polymer film
2 Innermost layer of roll of polymer film
3 Point 50% of total film length away from end of innermost layer of roll of polymer film
5 Gap between adjacent layers of polymer film
10, 11, 12 Polymer film
40 Diselectrifier
50, 51 Polyimide film
52 Roll of polymer film
55 Inner case
60 Stage
100 Core
110 Core used during heat treatment
200, 210, 220 End of roll of carbonaceous film
300 Pick-up roller
310 Guide roller
400 Space
500 Heater
600 Thickness of roll of polymer film after winding polymer film around core
610 Thickness of layers of polymer film wound around core
650 Stage

The invention claimed is:

1. A method for producing a carbonaceous film, comprising the steps of
    winding a polymer film into a roll at a temperature lower than a pyrolysis onset temperature of the polymer film to obtain a roll of the polymer film so that i) the cross-section of the roll has an inner portion defined by a first 50% of a total length of the polymer film and an outer portion defined by a second 50% of the total length of the polymer film, ii) the inner portion of the cross-section of the roll has a cross-section of the polymer film and a cross-section of a space, and iii) a total cross-sectional area of the space counts for at least 25% of a total area of the inner portion of the cross-section of the roll; and
    heat-treating the roll of the polymer film to obtain the carbonaceous film.

2. The method for producing a carbonaceous film according to claim 1, wherein the roll of the polymer film is obtained by winding the polymer film around a core so as to obtain the roll of the polymer film disposed around the core.

3. The method for producing a carbonaceous film according to claim 2, wherein there is a space between the core and an innermost layer of the roll of polymer film.

4. The method for producing a carbonaceous film according to claim 2 or 3, wherein a value obtained by dividing the diameter of the core (Rs) by an inner diameter of the roll of polymer film (Rf) (Rs/Rf) is 0.90 or lower.

5. The method for producing a carbonaceous film according to claim 1, wherein a gap is provided between adjacent layers of the polymer film in the roll of polymer film.

6. The method for producing a carbonaceous film according to claim 5, wherein the gap between adjacent layers of the polymer film is formed by winding the polymer film into a roll together with a slip sheet and then removing the slip sheet.

7. The method for producing a carbonaceous film according to claim 5, wherein the gap between adjacent layers of the polymer film is formed by loosening the roll of the polymer film wound around the core in a direction opposite to a winding direction of the polymer film.

8. A method for producing a graphite film, comprising heat-treating a carbonaceous film obtained by the carbonaceous film production method according to claim 1 to a temperature of 2400° C. or higher.

9. A roll of carbonaceous film to be used in the graphite film production method according to claim 8, wherein i) the cross-section of the roll has an inner portion defined by a first 50% of a total length of the polymer film and an outer portion defined by a second 50% of the total length of the polymer film, ii) the inner portion of the cross-section of the roll has a cross-section of the polymer film and a cross-section of a space, and iii) a total cross-sectional area of the space counts for 25% to 80% of a total area of the inner portion of the cross-section of the roll.

* * * * *